United States Patent
You et al.

(10) Patent No.: US 10,264,571 B2
(45) Date of Patent: Apr. 16, 2019

(54) UPLINK CONTROL INFORMATION RECEPTION METHOD AND USER EQUIPMENT, AND DOWNLINK CONTROL INFORMATION TRANSMISSION METHOD AND BASE STATION

(71) Applicant: LG ELECTRONICS INC., Seoul (KR)

(72) Inventors: Hyangsun You, Seoul (KR); Hanbyul Seo, Seoul (KR); Yunjung Yi, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/547,148

(22) PCT Filed: Jan. 29, 2016

(86) PCT No.: PCT/KR2016/000982
§ 371 (c)(1),
(2) Date: Jul. 28, 2017

(87) PCT Pub. No.: WO2016/122242
PCT Pub. Date: Aug. 4, 2016

(65) Prior Publication Data
US 2018/0014283 A1    Jan. 11, 2018

Related U.S. Application Data

(60) Provisional application No. 62/109,067, filed on Jan. 29, 2015.

(51) Int. Cl.
*H04W 72/04*    (2009.01)
*H04L 5/00*    (2006.01)
(Continued)

(52) U.S. Cl.
CPC ......... *H04W 72/042* (2013.01); *H04L 5/0057* (2013.01); *H04L 5/0094* (2013.01);
(Continued)

(58) Field of Classification Search
CPC ... H04W 72/042; H04W 48/12; H04W 28/06; H04W 74/08; H04L 5/0094; H04L 5/00; H04L 5/0053
See application file for complete search history.

(56) References Cited

U.S. PATENT DOCUMENTS 8,787,275 B2 * 7/2014 Nishio ................... H04L 1/1854
370/329
9,814,034 B2 * 11/2017 Horiuchi ........... H04W 72/0446
(Continued)

OTHER PUBLICATIONS

Intel Corporation, "Control channel enhancement for unicast transmission for MTC," 3GPP TSG RAN WG1 Meeting #79, R1-144661, San Francisco, USA, Nov. 17-21, 2014, pp. 2-7, (Total pp. 6).

(Continued)

*Primary Examiner* — Jay P Patel
(74) *Attorney, Agent, or Firm* — Birch, Stewart, Kolasch & Birch, LLP

(57) ABSTRACT

A search space for a user equipment can be set over a plurality of subframes. The starting positions of the starting subframe of the search space and a control channel for the user equipment may be different. The start of the search space is limited to a set of specific subframes. The search space may occur cyclically. The cycle of the search space is prefixed, or may be set for the user equipment by means of system information or an upper layer signal.

17 Claims, 15 Drawing Sheets

(51) Int. Cl.
*H04W 48/12* (2009.01)
*H04W 28/06* (2009.01)
*H04W 74/08* (2009.01)

(52) U.S. Cl.
CPC .......... *H04W 48/12* (2013.01); *H04L 5/0053* (2013.01); *H04L 5/0092* (2013.01); *H04W 28/06* (2013.01); *H04W 74/08* (2013.01)

(56) References Cited

U.S. PATENT DOCUMENTS

| | | | | |
|---|---|---|---|---|
| 2011/0222491 | A1* | 9/2011 | Vajapeyam | H04L 1/0038 370/329 |
| 2013/0114563 | A1* | 5/2013 | Oizumi | H04L 5/001 370/329 |
| 2013/0121295 | A1* | 5/2013 | Saito | H04L 5/001 370/329 |
| 2013/0148593 | A1* | 6/2013 | Suzuki | H04L 5/0051 370/329 |
| 2013/0194956 | A1 | 8/2013 | Sartori et al. | |
| 2013/0208633 | A1* | 8/2013 | Gao | H04L 1/1861 370/280 |
| 2013/0250906 | A1* | 9/2013 | Golitschek Edler von Elbwart | H04W 72/0453 370/330 |
| 2014/0044088 | A1* | 2/2014 | Nogami | H04J 11/0069 370/329 |
| 2014/0233470 | A1 | 8/2014 | Kim et al. | |
| 2014/0376457 | A1* | 12/2014 | Feng | H04L 5/001 370/329 |
| 2015/0181577 | A1* | 6/2015 | Moulsley | H04L 5/0053 370/329 |
| 2015/0296488 | A1* | 10/2015 | Shimezawa | H04W 72/0406 370/329 |
| 2016/0112994 | A1* | 4/2016 | Wang | H04L 5/0048 370/329 |
| 2017/0207887 | A1* | 7/2017 | Horiuchi | H04L 5/001 |

OTHER PUBLICATIONS

NTT Docomo, "Design of EPDCCH search space for low cost MTC," 3GPP TSG RAN WG1 Meeting #79, R1-144964, San Francisco, USA, Nov. 17-21, 2014, pp. 2-5, (Total pp. 4).

Sony, "MTC Operation with a Narrowband PDCCH," 3GPP TSG-RAN WG1 Meeting #79, R1-145018, San Francisco, USA, Nov. 17-21, 2014, pp. 2-16, (Total pp. 15).

* cited by examiner

FIG. 5
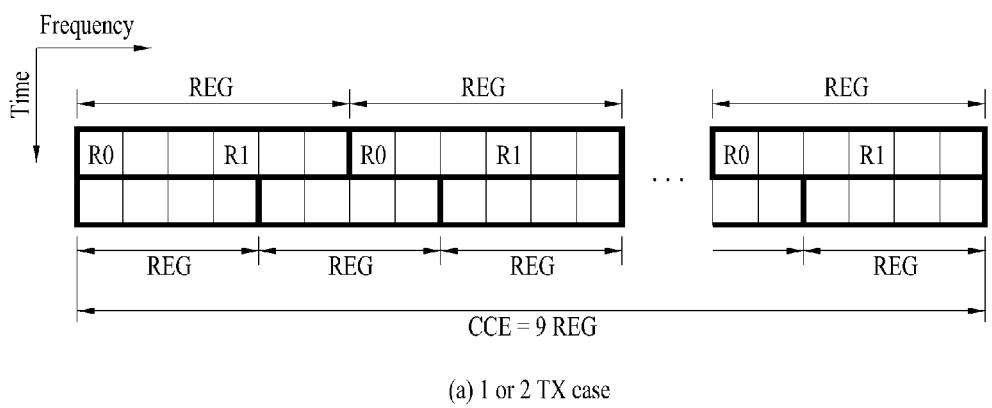
(a) 1 or 2 TX case
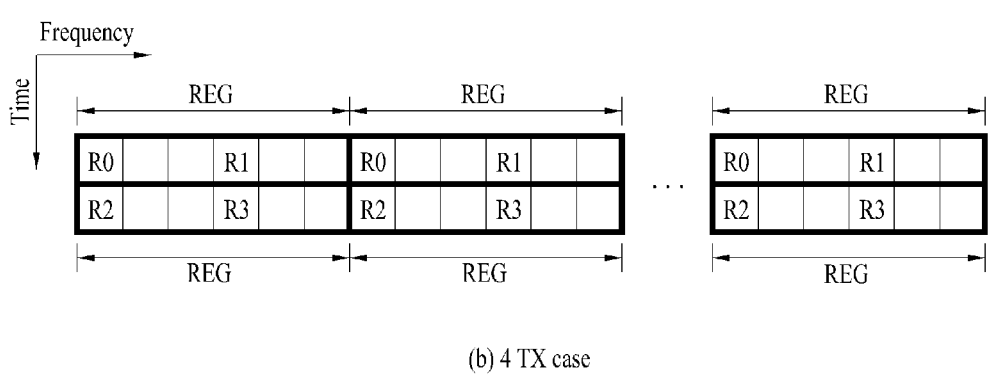
(b) 4 TX case

FIG. 11

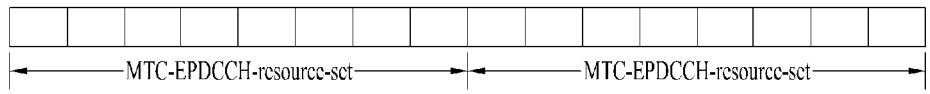

FIG. 12

| ECCE 0 | ECCE 0 | ECCE 0 | ECCE 0 | ECCE 0 | ECCE 0 | ECCE 0 | ECCE 0 |
|---|---|---|---|---|---|---|---|
| ECCE 1 | ECCE 1 | ECCE 1 | ECCE 1 | ECCE 1 | ECCE 1 | ECCE 1 | ECCE 1 |
| ECCE 2 | ECCE 2 | ECCE 2 | ECCE 2 | ECCE 2 | ECCE 2 | ECCE 2 | ECCE 2 |
| ECCE 3 | ECCE 3 | ECCE 3 | ECCE 3 | ECCE 3 | ECCE 3 | ECCE 3 | ECCE 3 |
| SF 0 | SF 1 | SF 2 | SF 3 | SF 4 | SF 5 | SF 6 | SF 7 |

(a)

| ECCE 0 | ECCE 4 | ECCE 8 | ECCE 12 | ECCE 16 | ECCE 20 | ECCE 24 | ECCE 28 |
|---|---|---|---|---|---|---|---|
| ECCE 1 | ECCE 5 | ECCE 9 | ECCE 13 | ECCE 17 | ECCE 21 | ECCE 25 | ECCE 29 |
| ECCE 2 | ECCE 6 | ECCE 10 | ECCE 14 | ECCE 18 | ECCE 22 | ECCE 26 | ECCE 30 |
| ECCE 3 | ECCE 7 | ECCE 11 | ECCE 15 | ECCE 19 | ECCE 23 | ECCE 27 | ECCE 31 |
| SF 0 | SF 1 | SF 2 | SF 3 | SF 4 | SF 5 | SF 6 | SF 7 |

(b)

| ECCE 24 | ECCE 25 | ECCE 26 | ECCE 27 | ECCE 28 | ECCE 29 | ECCE 30 | ECCE 31 |
|---|---|---|---|---|---|---|---|
| ECCE 16 | ECCE 17 | ECCE 18 | ECCE 19 | ECCE 20 | ECCE 21 | ECCE 22 | ECCE 23 |
| ECCE 8 | ECCE 9 | ECCE 10 | ECCE 11 | ECCE 12 | ECCE 13 | ECCE 14 | ECCE 15 |
| ECCE 0 | ECCE 1 | ECCE 2 | ECCE 3 | ECCE 4 | ECCE 5 | ECCE 6 | ECCE 7 |
| SF 0 | SF 1 | SF 2 | SF 3 | SF 4 | SF 5 | SF 6 | SF 7 |

| EPDCCH candidate 0 | EPDCCH candidate 0 | EPDCCH candidate 0 | EPDCCH candidate 0 | EPDCCH candidate 0 | EPDCCH candidate 0 | EPDCCH candidate 0 | EPDCCH candidate 0 |
|---|---|---|---|---|---|---|---|
| EPDCCH candidate 1 | EPDCCH candidate 1 | EPDCCH candidate 1 | EPDCCH candidate 1 | EPDCCH candidate 1 | EPDCCH candidate 1 | EPDCCH candidate 1 | EPDCCH candidate 1 |
| EPDCCH candidate 2 | EPDCCH candidate 2 | EPDCCH candidate 2 | EPDCCH candidate 2 | EPDCCH candidate 2 | EPDCCH candidate 2 | EPDCCH candidate 2 | EPDCCH candidate 2 |
| EPDCCH candidate 3 | EPDCCH candidate 3 | EPDCCH candidate 3 | EPDCCH candidate 3 | EPDCCH candidate 3 | EPDCCH candidate 3 | EPDCCH candidate 3 | EPDCCH candidate 3 |
| SF 0 | SF 1 | SF 2 | SF 3 | SF 4 | SF 5 | SF 6 | SF 7 |

(a)

| EPDCCH candidate 0 | EPDCCH candidate 4 | EPDCCH candidate 8 | EPDCCH candidate 12 | EPDCCH candidate 16 | EPDCCH candidate 20 | EPDCCH candidate 24 | EPDCCH candidate 28 |
|---|---|---|---|---|---|---|---|
| EPDCCH candidate 1 | EPDCCH candidate 5 | EPDCCH candidate 9 | EPDCCH candidate 13 | EPDCCH candidate 17 | EPDCCH candidate 21 | EPDCCH candidate 25 | EPDCCH candidate 29 |
| EPDCCH candidate 2 | EPDCCH candidate 6 | EPDCCH candidate 10 | EPDCCH candidate 14 | EPDCCH candidate 18 | EPDCCH candidate 22 | EPDCCH candidate 26 | EPDCCH candidate 30 |
| EPDCCH candidate 3 | EPDCCH candidate 7 | EPDCCH candidate 11 | EPDCCH candidate 15 | EPDCCH candidate 19 | EPDCCH candidate 23 | EPDCCH candidate 27 | EPDCCH candidate 31 |
| SF 0 | SF 1 | SF 2 | SF 3 | SF 4 | SF 5 | SF 6 | SF 7 |

(b)

| EPDCCH candidate 24 | EPDCCH candidate 25 | EPDCCH candidate 26 | EPDCCH candidate 27 | EPDCCH candidate 28 | EPDCCH candidate 29 | EPDCCH candidate 30 | EPDCCH candidate 31 |
|---|---|---|---|---|---|---|---|
| EPDCCH candidate 16 | EPDCCH candidate 17 | EPDCCH candidate 18 | EPDCCH candidate 19 | EPDCCH candidate 20 | EPDCCH candidate 21 | EPDCCH candidate 22 | EPDCCH candidate 23 |
| EPDCCH candidate 8 | EPDCCH candidate 9 | EPDCCH candidate 10 | EPDCCH candidate 11 | EPDCCH candidate 12 | EPDCCH candidate 13 | EPDCCH candidate 14 | EPDCCH candidate 15 |
| EPDCCH candidate 0 | EPDCCH candidate 1 | EPDCCH candidate 2 | EPDCCH candidate 3 | EPDCCH candidate 4 | EPDCCH candidate 5 | EPDCCH candidate 6 | EPDCCH candidate 7 |
| SF 0 | SF 1 | SF 2 | SF 3 | SF 4 | SF 5 | SF 6 | SF 7 |

(c)

UPLINK CONTROL INFORMATION RECEPTION METHOD AND USER EQUIPMENT, AND DOWNLINK CONTROL INFORMATION TRANSMISSION METHOD AND BASE STATION

CROSS REFERENCE TO RELATED APPLICATIONS

This application is the National Phase of PCT International Application No. PCT/KR2016/000982, filed on Jan. 29, 2016, which claims priority under 35 U.S.C. 119(e) to U.S. Provisional Application No. 62/109,067, filed on Jan. 29, 2015, all of which are hereby expressly incorporated by reference into the present application.

TECHNICAL FIELD

The present invention relates to a wireless communication system, and more particularly, to a method for reporting channel status information through a user equipment in a wireless communication system supporting carrier aggregation and an apparatus for the method.

BACKGROUND ART

With appearance and spread of machine-to-machine (M2M) communication and a variety of devices such as smartphones and tablet PCs and technologies demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted within limited frequency resources have been developed.

A general wireless communication system performs data transmission/reception through one downlink (DL) band and through one uplink (UL) band corresponding to the DL band (in case of a frequency division duplex (FDD) mode), or divides a prescribed radio frame into a UL time unit and a DL time unit in the time domain and then performs data transmission/reception through the UL/DL time unit (in case of a time division duplex (TDD) mode). A base station (BS) and a user equipment (UE) transmit and receive data and/or control information scheduled on a prescribed time unit basis, e.g. on a subframe basis. The data is transmitted and received through a data region configured in a UL/DL subframe and the control information is transmitted and received through a control region configured in the UL/DL subframe. To this end, various physical channels carrying radio signals are formed in the UL/DL subframe. In contrast, carrier aggregation technology serves to use a wider UL/DL bandwidth by aggregating a plurality of UL/DL frequency blocks in order to use a broader frequency band so that more signals relative to signals when a single carrier is used can be simultaneously processed.

Meanwhile, a communication environment evolves into an environment that density of a node that may be accessed by a UE is increased. The node means a fixed point that includes one or more antennas to transmit/receive radio signals to and from a UE. A communication system provided with a node of high density may provide the UE with a communication service of higher throughput through cooperation between nodes.

DISCLOSURE

Technical Problem

Due to the introduction of new radio communication technology, the number of user equipments (UEs) to which a BS should provide a service in a predetermined resource region increases and the amount of data and control information that the BS should transmit to the UEs increases. Since the amount of resources available to the BS for communication with the UE(s) is limited, a new method in which the BS efficiently receives/transmits uplink/downlink data and/or uplink/downlink control information using the limited radio resources is needed.

The technical objects that can be achieved through the present invention are not limited to what has been particularly described hereinabove and other technical objects not described herein will be more clearly understood by persons skilled in the art from the following detailed description.

Technical Solution

A method for receiving downlink control information in a user equipment (UE), the method comprising: receiving configuration information of a search space for the UE; and receiving the downlink control information through downlink control channel candidates within the search space based on the configuration information, wherein the search space is configured over a plurality of subframes, and the configuration information includes information indicating a period of the search space.

Additionally or alternatively, the period of the search space is longer or the same as a duration of the search space.

Additionally or alternatively, the configuration information includes information indicating a starting subframe of the search space.

Additionally or alternatively, the search space includes a plurality of downlink control channel candidates, and the downlink control information is received through each of two or more of the plurality of downlink control channel candidates.

Additionally or alternatively, the downlink control channel candidates are configured in one or more subframe bundles, and each of which includes one or more of the plurality of subframes for the search space.

Additionally or alternatively, transmission of downlink data according to the downlink control information starts at subframe n+k, after the last subframe n of the search space, where k is a positive integer.

Additionally or alternatively, each of the plurality of subframes is divided into a control region, which includes one or more front symbols, and a data region, which includes symbols which do not belong to the control region, in the time domain, and the downlink control channel candidates are comprised of resources within the data region of one or more of the plurality of subframes.

A UE configured to receive downlink control information, the UE comprising: a radio frequency (RF) unit; and a processor configured to control the RF unit, wherein the processor is configured to: control the RF unit to receive configuration information of a search space for the UE, and control the RF unit to receive the downlink control information through downlink control channel candidates within the search space based on the configuration information, and wherein the search space is configured over a plurality of subframes, and the configuration information includes information indicating a period of the search space.

Additionally or alternatively, the period of the search space is longer or the same as a duration of the search space.

Additionally or alternatively, the configuration information includes information indicating a starting subframe of the search space.

Additionally or alternatively, the search space includes a plurality of downlink control channel candidates, and the downlink control information is received through each of two or more of the plurality of downlink control channel candidates.

Additionally or alternatively, the downlink control channel candidates are configured in one or more subframe bundles, and each of which includes one or more of the plurality of subframes for the search space.

Additionally or alternatively, transmission of downlink data according to the downlink control information starts at subframe n+k after the last subframe n of the search space, where k is a positive integer.

A method for transmitting downlink control information from a base station, the method comprising: transmitting configuration information of a search space for a UE; and transmitting the downlink control information through downlink control channel candidates within the search space based on the configuration information, wherein the search space is configured over a plurality of subframes, and the configuration information includes information indicating a period of the search space.

A base station configured to transmit downlink control information, the base station comprising: a radio frequency (RF) unit; and a processor configured to control the RF unit, wherein the processor is configured to:

control the RF unit to transmit configuration information of a search space for a UE, and control the RF unit to transmit the downlink control information through downlink control channel candidates within the search space based on the configuration information, and wherein the search space is configured over a plurality of subframes, and the configuration information includes information indicating a period of the search space.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 5 illustrates a resource unit used to configure a downlink control channel;

FIG. 11 illustrates MTC-EPDCCH-resource set;

FIG. 12 illustrates ECCE(s) that configures MTC-EPDCCH candidates according to the present invention;

FIG. 14 illustrates EPDCCH candidate(s) that configure(s) MTC-EPDCCH candidate according to the present invention;

BEST MODE FOR CARRYING OUT THE INVENTION

Figure 1:
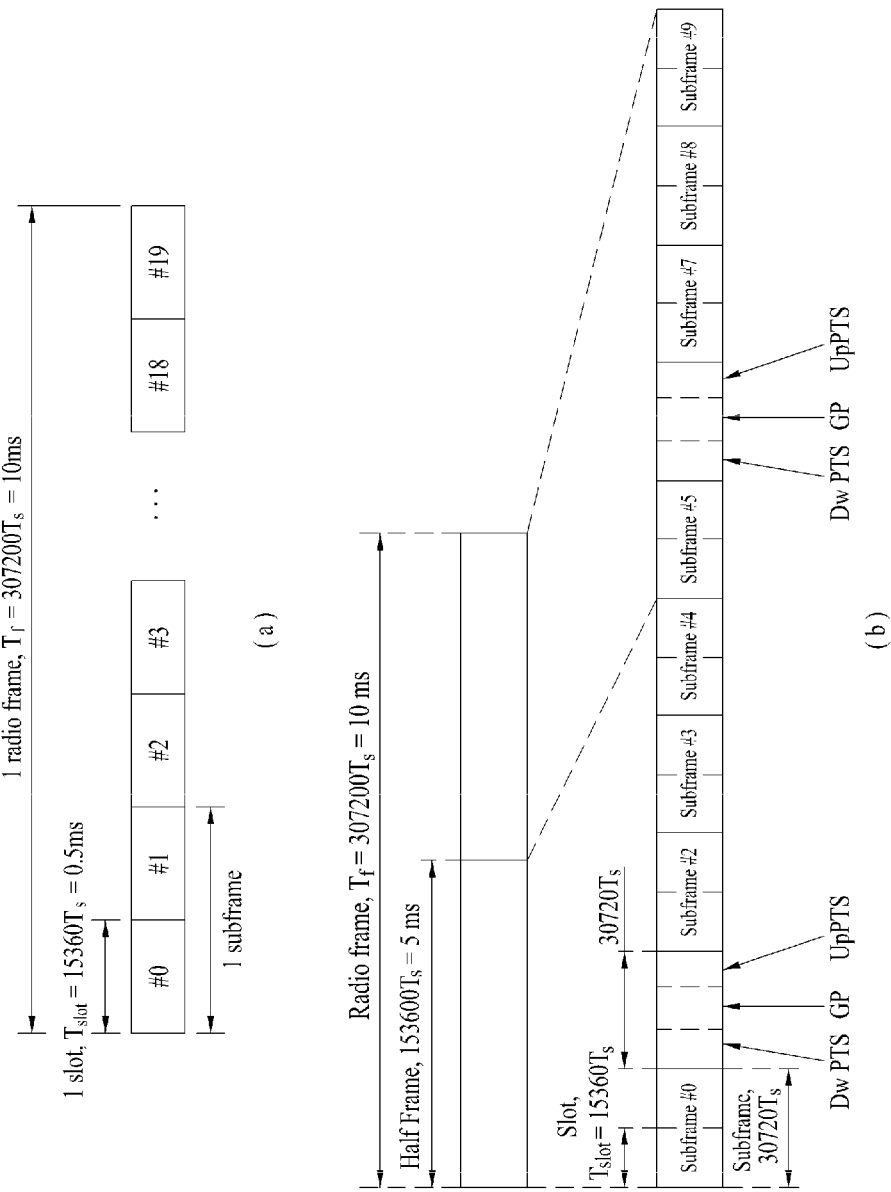
FIG. 1 illustrates an example of a radio frame structure used in a wireless communication system.

Hereinafter, exemplary embodiments of the present invention will be described with reference to the accompanying drawings. The detailed description, which will be disclosed along with the accompanying drawings, is intended to describe exemplary embodiments of the present invention and is not intended to describe a unique embodiment through which the present invention can be carried out. The following detailed description includes specific details in order to provide a thorough understanding of the present invention. However, it will be apparent to those skilled in the art that the present invention may be practiced without such specific details.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE) (that is, GERAN). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunication system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE. For convenience of description, it is assumed that the present invention is applied to 3GPP LTE/LTE-A. However, the technical features of the present invention are not limited thereto. For example, although the following detailed description is given based on a mobile communication system corresponding to a 3GPP LTE/LTE-A system, aspects of the present invention that are not specific to 3GPP LTE/LTE-A are applicable to other mobile communication systems.

For example, the present invention is applicable to contention based communication such as Wi-Fi as well as non-contention based communication as in the 3GPP LTE/LTE-A system in which an eNB allocates a DL/UL time/frequency resource to a UE and the UE receives a DL signal and transmits a UL signal according to resource allocation of the eNB. In a non-contention based communication scheme, an access point (AP) or a control node for controlling the AP allocates a resource for communication between the UE and the AP, whereas, in a contention based communication scheme, a communication resource is occupied through contention between UEs which desire to access the AP. The contention based communication scheme will now be described in brief. One type of the contention based communication scheme is carrier sense multiple access (CSMA). CSMA refers to a probabilistic media access control (MAC) protocol for confirming, before a node or a communication device transmits traffic on a shared transmission medium (also called a shared channel) such as a frequency band, that there is no other traffic on the same shared transmission medium. In CSMA, a transmission device determines whether another transmission is being performed before attempting to transmit traffic to a reception device. In other words, the transmission device attempts to detect the presence of a carrier from another transmission device before attempting to perform transmission. Upon sensing the carrier, the transmission device waits for another transmission device which is performing transmission to finish transmission, before initiating transmission thereof. Consequently, CSMA can be a communication scheme based on the principle of "sense before transmit" or "listen before talk". A scheme for avoiding collision between transmission devices in the contention based communication system using CSMA includes carrier sense multiple access with collision detection (CSMA/CD) and/or carrier sense multiple access with collision avoidance (CSMA/CA). CSMA/CD is a collision detection scheme in a wired local area network (LAN) environment. In CSMA/CD, a personal computer (PC) or a server which desires to perform communication in an Ethernet environment first confirms whether communication occurs on a network and, if another device carries data on the network, the PC or the server waits and then transmits data. That is, when two or more users (e.g. PCs, UEs, etc.) simultaneously transmit data, collision occurs between simultaneous transmission, and CSMA/CD is a scheme for flexibly transmitting data by monitoring collision. A transmission device using CSMA/CD adjusts data transmission thereof by sensing data transmission performed by another device using a specific rule. CSMA/CA is a MAC protocol specified in IEEE 802.11 standards. A wireless LAN (WLAN) system conforming to IEEE 802.11 standards does not use CSMA/CD which has been used in IEEE 802.3 standards and uses CA, i.e. a collision avoidance scheme. Transmission devices always sense carrier of a network and, if the network is empty, the transmission devices wait for determined time according to locations thereof registered in a list and then transmit data. Various methods are used to determine priority of the transmission devices in the list and to reconfigure priority. In a system according to some versions of IEEE 802.11 standards, collision may occur and, in this case, a collision sensing procedure is performed. A transmission device using CSMA/CA avoids collision between data transmission thereof and data transmission of another transmission device using a specific rule.

In the present invention, a user equipment (UE) may be a fixed or mobile device. Examples of the UE include various devices that transmit and receive user data and/or various kinds of control information to and from a base station (BS). The UE may be referred to as a terminal equipment (TE), a mobile station (MS), a mobile terminal (MT), a user terminal (UT), a subscriber station (SS), a wireless device, a personal digital assistant (PDA), a wireless modem, a handheld device, etc. In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In describing the present invention, a BS will be referred to as an eNB.

In the present invention, a node refers to a fixed point capable of transmitting/receiving a radio signal through communication with a UE. Various types of eNBs may be used as nodes irrespective of the terms thereof. For example, a BS, a node B (NB), an e-node B (eNB), a pico-cell eNB (PeNB), a home eNB (HeNB), a relay, a repeater, etc. may be a node. In addition, the node may not be an eNB. For example, the node may be a radio remote head (RRH) or a radio remote unit (RRU). The RRH or RRU generally has a lower power level than a power level of an eNB. Since the RRH or RRU (hereinafter, RRH/RRU) is generally connected to the eNB through a dedicated line such as an optical cable, cooperative communication between RRH/RRU and the eNB can be smoothly performed in comparison with cooperative communication between eNBs connected by a radio line. At least one antenna is installed per node. The antenna may mean a physical antenna or mean an antenna port, a virtual antenna, or an antenna group. A node may be referred to as a point.

In the present invention, a cell refers to a prescribed geographical area to which one or more nodes provide a communication service. Accordingly, in the present invention, communicating with a specific cell may mean communicating with an eNB or a node which provides a communication service to the specific cell. In addition, a DL/UL signal of a specific cell refers to a DL/UL signal from/to an eNB or a node which provides a communication service to the specific cell. A node providing UL/DL communication services to a UE is called a serving node and a cell to which UL/DL communication services are provided by the serving node is especially called a serving cell. Furthermore, channel status/quality of a specific cell refers to channel status/quality of a channel or communication link formed between an eNB or node which provides a communication service to the specific cell and a UE. In the LTE/LTE-A based system, the UE may measure DL channel state received from a specific node using cell-specific reference signal(s) (CRS(s)) transmitted on a CRS resource and/or channel state information reference signal(s) (CSI-RS(s)) transmitted on a CSI-RS resource, allocated by antenna port(s) of the specific node to the specific node. Meanwhile, a 3GPP LTE/LTE-A system uses the concept of a cell in order to manage radio resources and a cell associated with the radio resources is distinguished from a cell of a geographic region.

A "cell" of a geographic region may be understood as coverage within which a node can provide a service using a carrier and a "cell" of a radio resource is associated with bandwidth (BW) which is a frequency range configured by the carrier. Since DL coverage, which is a range within which the node is capable of transmitting a valid signal, and UL coverage, which is a range within which the node is capable of receiving the valid signal from the UE, depends upon a carrier carrying the signal, coverage of the node may be associated with coverage of "cell" of a radio resource used by the node. Accordingly, the term "cell" may be used to indicate service coverage by the node sometimes, a radio resource at other times, or a range that a signal using a radio resource can reach with valid strength at other times. The "cell" of the radio resource will later be described in detail.

3GPP LTE/LTE-A standards define DL physical channels corresponding to resource elements carrying information derived from a higher layer and DL physical signals corresponding to resource elements which are used by a physical layer but which do not carry information derived from a higher layer. For example, a physical downlink shared channel (PDSCH), a physical broadcast channel (PBCH), a physical multicast channel (PMCH), a physical control format indicator channel (PCFICH), a physical downlink control channel (PDCCH), and a physical hybrid ARQ indicator channel (PHICH) are defined as the DL physical channels, and a reference signal and a synchronization signal are defined as the DL physical signals. A reference signal (RS), also called a pilot, refers to a special waveform of a predefined signal known to both a BS and a UE. For example, a cell-specific RS (CRS), a UE-specific RS (UE-RS), a positioning RS (PRS), and channel state information RS (CSI-RS) may be defined as DL RSs. Meanwhile, the 3GPP LTE/LTE-A standards define UL physical channels corresponding to resource elements carrying information derived from a higher layer and UL physical signals corresponding to resource elements which are used by a physical layer but which do not carry information derived from a higher layer. For example, a physical uplink shared channel (PUSCH), a physical uplink control channel (PUCCH), and a physical random access channel (PRACH) are defined as the UL physical channels, and a demodulation reference signal (DM RS) for a UL control/data signal and a sounding reference signal (SRS) used for UL channel measurement are defined as the UL physical signals.

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or resource elements (REs) carrying downlink control information (DCI), a set of time-frequency resources or REs carrying a control format indicator (CFI), a set of time-frequency resources or REs carrying downlink acknowledgement (ACK)/negative ACK (HACK), and a set of time-frequency resources or REs carrying downlink data, respectively. In addition, a physical uplink control channel (PUCCH), a physical uplink shared channel (PUSCH) and a physical random access channel (PRACH) refer to a set of time-frequency resources or REs carrying uplink control information (UCI), a set of time-frequency resources or REs carrying uplink data and a set of time-frequency resources or REs carrying random access signals, respectively. In the present invention, in particular, a time-frequency resource or RE that is assigned to or belongs to PDCCH/PCFICH/ PHICH/PDSCH/PUCCH/PUSCH/PRACH is referred to as PDCCH/PCFICH/PHICH/PDSCH/PUCCH/PUSCH/PRA CHRE or PDCCH/PCFICH/PHICH/PDSCH/PUCCH/PU SCH/PRACH resource, respectively. Hereinafter, PUCCH/ PUSCH/PRACH transmission of a UE is conceptually identical to UCI/uplink data/random access signal transmission on PUSCH/PUCCH/PRACH, respectively. In addition, PDCCH/PCFICH/PHICH/PDSCH transmission of an eNB is conceptually identical to downlink data/DCI transmission on PDCCH/PCFICH/PHICH/PDSCH, respectively.

Hereinafter, OFDM symbol/subcarrier/RE to or for which CRS/DMRS/CSI-RS/SRS/UE-RS/TRS is assigned or configured will be referred to as CRS/DMRS/CSI-RS/SRS/UE-RS/symbol/carrier/subcarrier/RE. For example, an OFDM symbol to or for which a tracking RS (TRS) is assigned or configured is referred to as a TRS symbol, a subcarrier to or for which the TRS is assigned or configured is referred to as a TRS subcarrier, and an RE to or for which the TRS is assigned or configured is referred to as a TRS RE. In addition, a subframe configured for transmission of the TRS is referred to as a TRS subframe. Moreover, a subframe in which a broadcast signal is transmitted is referred to as a broadcast subframe or a PBCH subframe, and a subframe in which a synchronization signal (e.g., PSS and/or SSS) is transmitted is referred to a synchronization signal subframe or a PSS/SSS subframe. OFDM symbol/subcarrier/RE to or for which PSS/SSS is assigned or configured is referred to as PSS/SSS symbol/subcarrier/RE, respectively.

In the present invention, a CRS port, a UE-RS port, a CSI-RS port, and a TRS port refer to an antenna port configured to transmit a CRS, an antenna port configured to transmit a UE-RS, an antenna port configured to transmit a CSI-RS, and an antenna port configured to transmit a TRS, respectively. Antenna ports configured to transmit CRSs may be distinguished from each other by the locations of REs occupied by the CRSs according to CRS ports, antenna ports configured to transmit UE-RSs may be distinguished from each other by the locations of REs occupied by the UE-RSs according to UE-RS ports, and antenna ports configured to transmit CSI-RSs may be distinguished from each other by the locations of REs occupied by the CSI-RSs according to CSI-RS ports. Therefore, the terms CRS/UE-RS/CSI-RS/TRS ports may also be used to indicate a pattern of REs occupied by CRSs/UE-RSs/CSI-RSs/TRSs in a predetermined resource region.

FIG. 1 illustrates an example of a radio frame structure used in a wireless communication system.

Specifically, FIG. 1(a) illustrates an exemplary structure of a radio frame for frequency division multiplexing (FDD) used in a 3GPP LTE/LTE-A system, and FIG. 1(b) illustrates an exemplary structure of a radio frame for time division multiplexing (TDD) used in a 3GPP LTE/LTE-A system.

Referring to FIG. 1, the radio framed used in a 3GPP LTE/LTE-A system is 10 ms (307200 $T_s$) in duration. The radio frame is divided into 10 subframes (SFs) of equal size. Subframe numbers may be assigned to the 10 subframes within one radio frame, respectively. In this case, $T_s$ denotes sampling time and is represented by $T_s=1/(2048*15 \text{ kHz})$. Each subframe is 1 ms long and is further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may be configured differently depending on duplex modes. In FDD mode for example, since DL transmission and UL transmission are discriminated according to frequency, a radio frame for a specific frequency band includes either DL subframes or UL subframes. In TDD mode, since DL transmission and UL transmission are discriminated according to time, a radio frame for a specific frequency band includes both DL subframes and UL subframes.

Table 1 shows an exemplary UL-DL configuration of subframes within a radio frame in TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). The DwPTS is a time slot reserved for DL transmission and the UpPTS is a time slot reserved for UL transmission. Table 2 shows an example of the special subframe configuration.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS ee | Normal cyclic prefix in uplink | Extended cyclic prefix in uplink |
| 0 | 6592 · Ts | 2192 · Ts | 2560 · Ts | 7680 · Ts | 2192 · Ts | 2560 · Ts |
| 1 | 19760 · Ts | | | 20480 · Ts | | |
| 2 | 21952 · Ts | | | 23040 · Ts | | |
| 3 | 24144 · Ts | | | 25600 · Ts | | |
| 4 | 26336 · Ts | | | 7680 · Ts | 4384 · Ts | 5120 · Ts |
| 5 | 6592 · Ts | 4384 · Ts | 5120 · Ts | 20480 · Ts | | |
| 6 | 19760 · Ts | | | 23040 · Ts | | |
| 7 | 21952 · Ts | | | 12800 · Ts | | |
| 8 | 24144 · Ts | | | — | — | — |
| 9 | 13168 · Ts | | | — | — | — |

Figure 2:
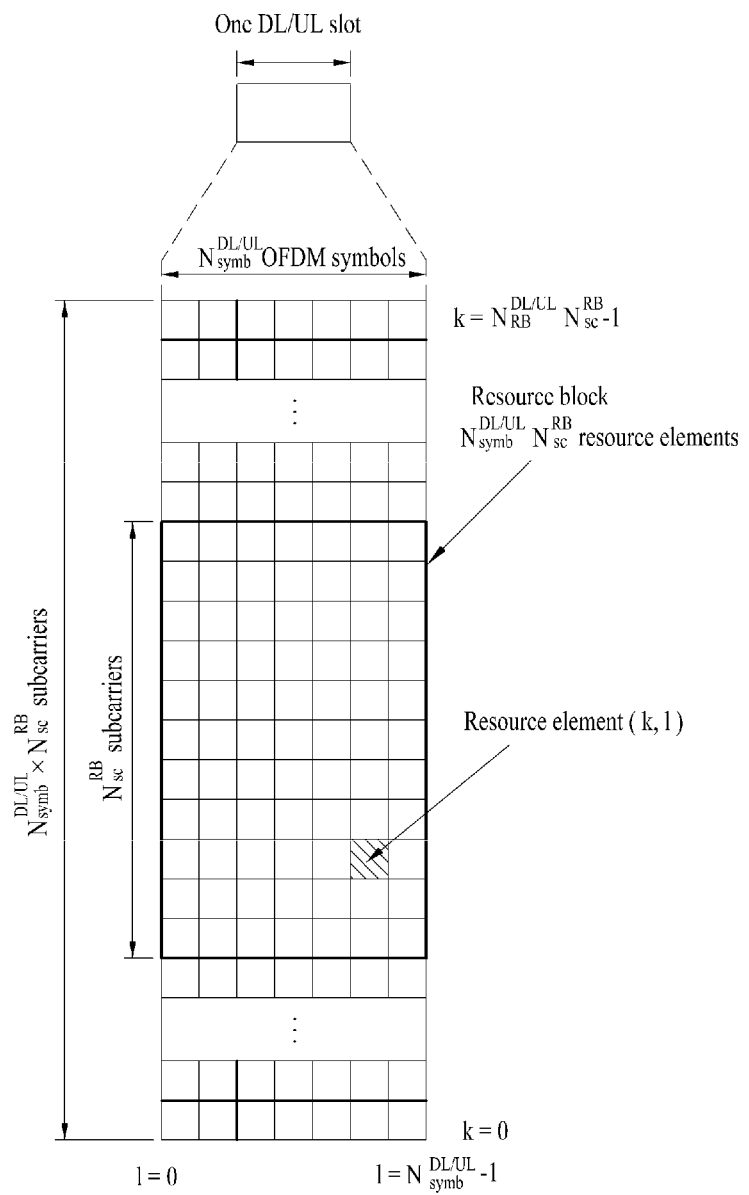
FIG. 2 illustrates an example of a downlink (DL)/uplink (UL) slot structure in a wireless communication system.

FIG. 2 illustrates an example of a DL/UL slot structure in a wireless communication system.

Referring to FIG. 2, a slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of RBs in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, a single carrier frequency division multiplexing (SC-FDM) symbol, etc. according to multiple access schemes. The number of OFDM symbols included in one slot may be varied according to channel bandwidths and CP lengths. For example, in case of a normal cyclic prefix (CP), one slot includes 7 OFDM symbols. In case of an extended CP, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is mapped to a carrier frequency $f_0$ in a process of generating an OFDM signal or in a frequency up-conversion process. The carrier frequency is also called a center frequency $f_c$.

One RB is defined as $N^{DL/UL}_{symb}$ (e.g., 7) consecutive OFDM symbols in the time domain and as $N^{RB}_{sc}$ (e.g., 12) consecutive subcarriers in the frequency domain. For reference, a resource comprised of one OFDM symbol and one subcarrier is referred to as a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and l is an index ranging from 0 to $N^{DL/UL}_{symb}1-1$ in the time domain.

Meanwhile, one RB is mapped to one physical resource block (PRB) and one virtual resource block (VRB). A PRB is defined as $N^{DL}_{synth}$ (e.g., 7) consecutive OFDM or SC-FDM symbols in the time domain and $N^{RB}_{sc}$ (e.g., 12) consecutive subcarriers in the frequency domain. Accordingly, one PRB includes $N^{DL/UL}_{symb}*N^{RB}_{sc}$ REs. In one subframe, two RBs each located in two slots of the subframe while occupying the same $N^{RB}_{sc}$ consecutive subcarriers are referred to as a physical resource block (PRB) pair. Two RBs configuring a PRB pair have the same PRB number (or the same PRB index).

Figure 3:
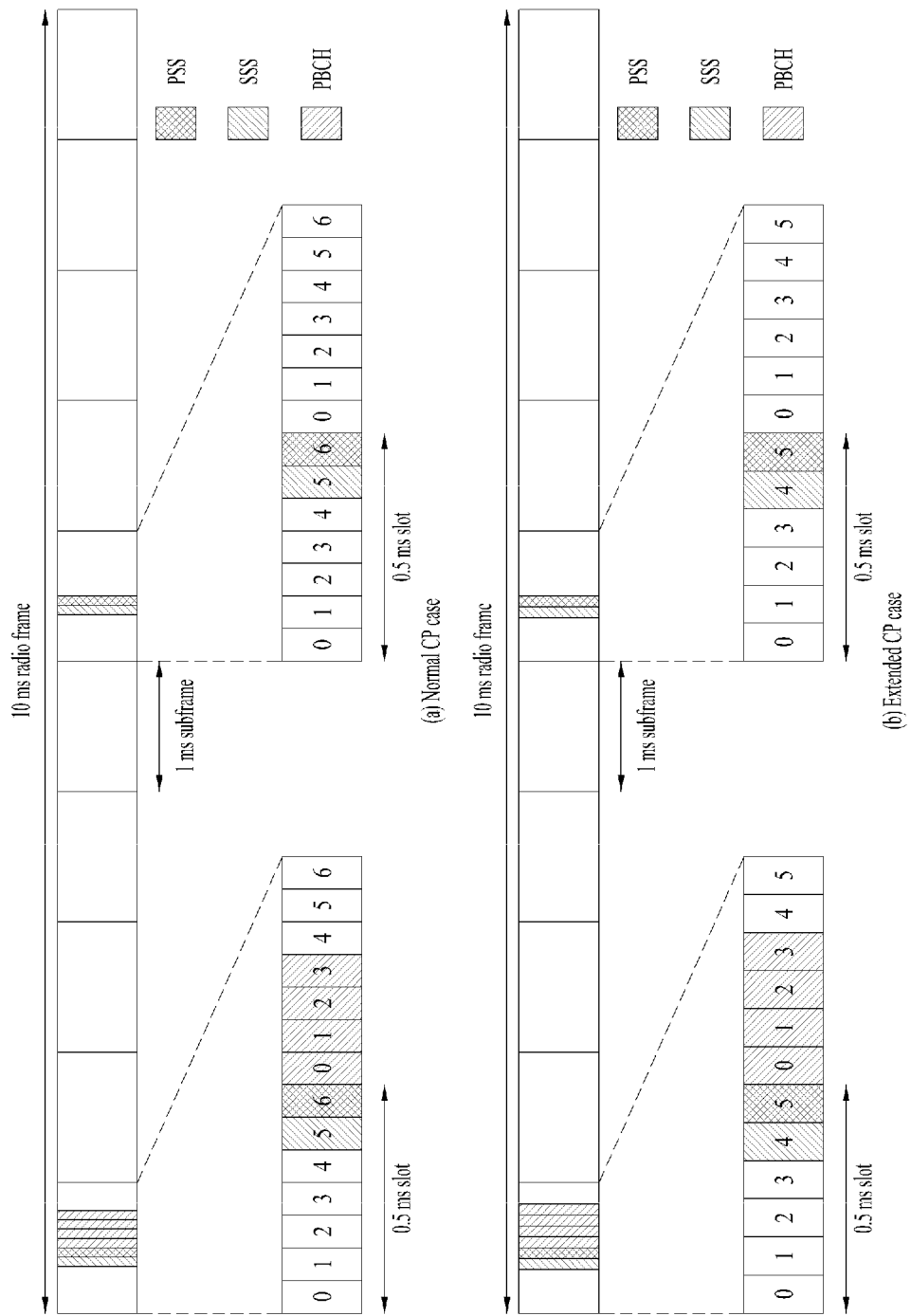
FIG. 3 illustrates a radio frame structure for transmission of a synchronization signal (SS)

FIG. 3 illustrates a radio frame structure for transmission of a synchronization signal (SS). Specifically, FIG. 3 illustrates a radio frame structure for transmission of an SS and a PBCH in frequency division duplex (FDD), wherein FIG. 3(a) illustrates transmission locations of an SS and a PBCH in a radio frame configured as a normal cyclic prefix (CP) and FIG. 3(b) illustrates transmission locations of an SS and a PBCH in a radio frame configured as an extended CP.

If a UE is powered on or newly enters a cell, the UE performs an initial cell search procedure of acquiring time and frequency synchronization with the cell and detecting a physical cell identity $N^{cell}_{ID}$ of the cell. To this end, the UE may establish synchronization with the eNB by receiving synchronization signals, e.g., a primary synchronization signal (PSS) and a secondary synchronization signal (SSS), from the eNB and obtain information such as a cell identity (ID).

An SS will be described in more detail with reference to FIG. 3. An SS is categorized into a PSS and an SSS. The PSS is used to acquire time-domain synchronization of OFDM symbol synchronization, slot synchronization, etc. and/or frequency-domain synchronization, and the SSS is used to acquire frame synchronization, a cell group ID, and/or CP configuration of a cell (i.e., information as to whether a normal CP is used or an extended CP is used). Referring to FIG. 3, each of a PSS and an SSS is transmitted on two OFDM symbols of every radio frame. More specifically, SSs are transmitted in the first slot of subframe 0 and the first slot of subframe 5, in consideration of a global system for mobile communication (GSM) frame length of 4.6 ms for facilitation of inter-radio access technology (inter-RAT) measurement. Especially, the PSS is transmitted on the last OFDM symbol of the first slot of subframe 0 and on the last OFDM symbol of the first slot of subframe 5, and the SSS is transmitted on the second to last OFDM symbol of the first slot of subframe 0 and on the second to last OFDM symbol of the first slot of subframe 5. A boundary of a corresponding radio frame may be detected through the SSS. The PSS is transmitted on the last OFDM symbol of a corresponding slot and the SSS is transmitted on an OFDM symbol immediately before an OFDM symbol on which the PSS is transmitted. A transmit diversity scheme of an SS uses only a single antenna port and standards therefor are not separately defined.

Upon detecting a PSS, a UE may discern that a corresponding subframe is one of subframe 0 and subframe 5 because the PSS is transmitted every 5 ms but the UE cannot discern whether the subframe is subframe 0 or subframe 5. Accordingly, the UE cannot recognize the boundary of a radio frame only by the PSS. That is, frame synchronization cannot be acquired only by the PSS. The UE detects the boundary of a radio frame by detecting an SSS which is transmitted twice in one radio frame with different sequences.

The UE, which has determined time and frequency parameters necessary for performing demodulation of a DL signal and transmission of a UL signal at an accurate time by performing a cell search procedure using PSS/SSS, can communicate with the eNB only after acquiring system information necessary for system configuration of the UE from the eNB.

The system information is configured by a master information block (MIB) and system information blocks (SIBs). Each SIB includes a set of functionally associated parameters and is categorized into an MIB, SIB Type 1 (SIB 1), SIB Type 2 (SIB2), and SIB3 to SIB17 in accordance with the parameters.

The MIB includes most frequently transmitted parameters which are essential for initial access of the UE to a network of the eNB. The UE may receive the MIB through a broadcast channel (e.g., PBCH). The MIB includes a DL bandwidth (BW), PHICH configuration, and a system frame number (SFN). Accordingly, the UE may be explicitly aware of information about the DL BW, SFN, and PHICH configuration by receiving the PBCH. Meanwhile, information which may be implicitly recognized by the UE through reception of the PBCH includes the number of transmitting antenna ports of the eNB. Information about the number of transmitting antennas of the eNB is implicitly signaled by masking (e.g. XOR operation) a sequence corresponding to the number of transmitting antennas to a 16-bit cyclic redundancy check (CRC) used for error detection of the PBCH.

The SIB1 includes parameters needed to determine if a specific cell is suitable for cell selection, as well as information about time-domain scheduling of the other SIBs. The SIB1 is received by the UE through broadcast signaling or dedicated signaling.

DL carrier frequency and corresponding system bandwidth may be acquired by the MIB carried by the PBCH. UL carrier frequency and corresponding system bandwidth may be acquired by system information which is a DL signal. The UE which has received the MIB applies a DL BW value within the MIB to a UL-bandwidth (UL BW) until system information block type 2 (SystemInformationBlockType2, SIB2) is received if there is no valid system information stored in a corresponding cell. For example, the UE may identify a full UL system band, which may be used by itself for UL transmission, through UL-carrier frequency and UL-bandwidth information within the SIB2 by acquiring system information block type 2 (SystemInformationBlock-Type2, SIB2).

In the frequency domain, a PSS/SSS and a PBCH are transmitted only in a total of 6 RBs, i.e., a total of 72 subcarriers, irrespective of actual system BW, wherein 3 RBs are in the left and the other 3 RBs are in the right centering on a DC subcarrier within corresponding OFDM symbols. Therefore, the UE is configured to detect or decode the SS and the PBCH irrespective of DL BW configured for the UE.

After initial cell search, the UE may perform a random access procedure to complete access to the eNB. To this end, the UE may transmit a preamble through a physical random access channel (PRACH) and receive a response message to the preamble through a PDCCH and a PDSCH. In contention based random access, the UE may perform additional PRACH transmission and a contention resolution procedure of a PDCCH and a PDSCH corresponding to the PDCCH.

After performing the aforementioned procedure, the UE may perform PDDCH/PDSCH reception and PUSCH/PUCCH transmission as general uplink/downlink transmission procedures.

Figure 4:
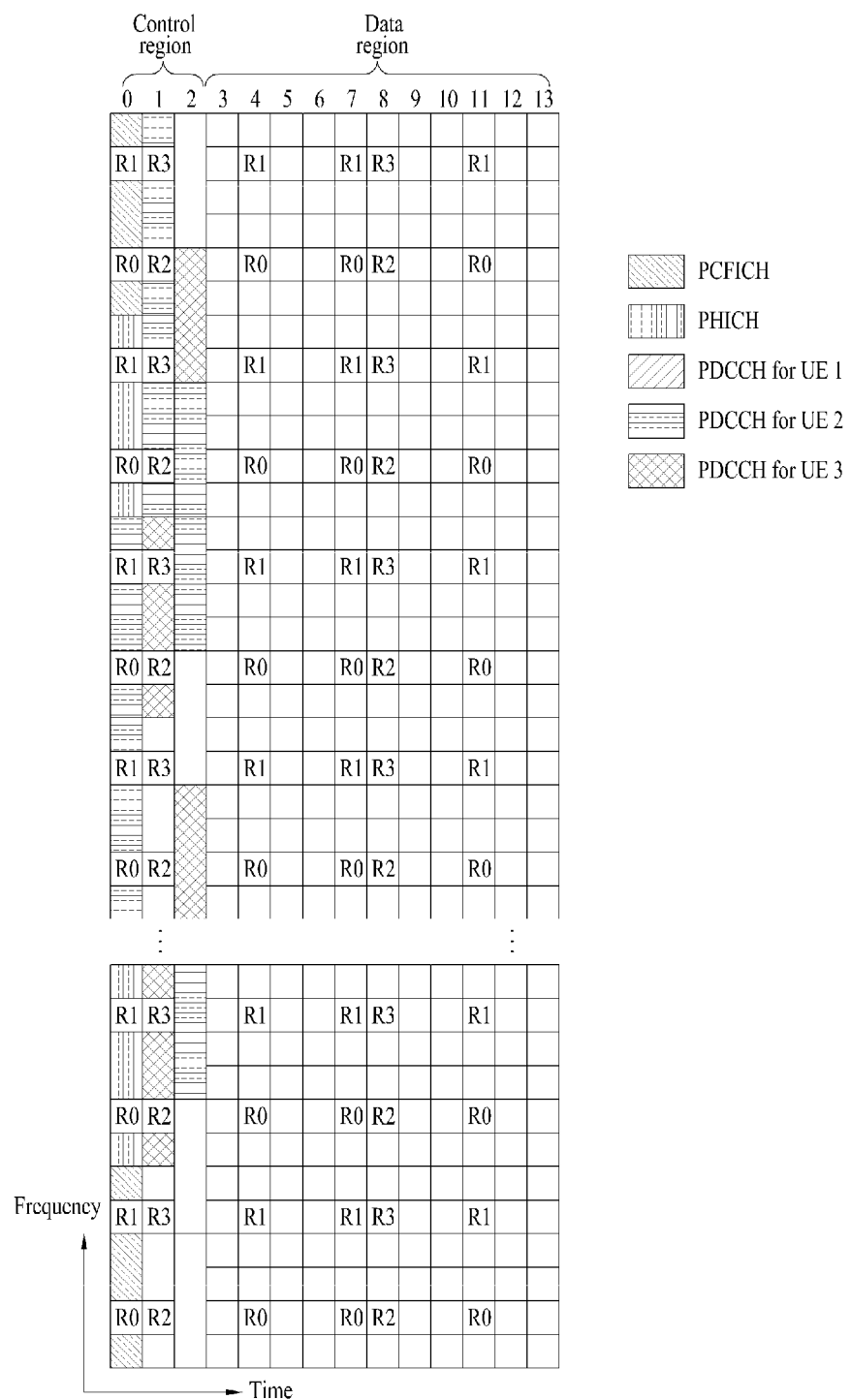
FIG. 4 illustrates a DL subframe structure used in a wireless communication system.

FIG. 4 illustrates an example of a DL subframe structure used in a wireless communication system.

Referring to FIG. 4, a DL subframe is divided into a control region and a data region in the time domain. Referring to FIG. 4, a maximum of 3 (or 4) OFDM symbols located in a front part of a first slot of a subframe corresponds to the control region. Hereinafter, a resource region for PDCCH transmission in a DL subframe is referred to as a PDCCH region. OFDM symbols other than the OFDM symbol(s) used in the control region correspond to the data region to which a physical downlink shared channel (PDSCH) is allocated. Hereinafter, a resource region available for PDSCH transmission in the DL subframe is referred to as a PDSCH region.

Examples of a DL control channel used in 3GPP LTE include a physical control format indicator channel (PCFICH), a physical downlink control channel (PDCCH), a physical hybrid ARQ indicator channel (PHICH), etc.

The PCFICH is transmitted in the first OFDM symbol of a subframe and carries information about the number of OFDM symbols available for transmission of a control channel within a subframe. The PCFICH notifies the UE of the number of OFDM symbols used for the corresponding subframe every subframe. The PCFICH is located at the first OFDM symbol. The PCFICH is configured by four resource element groups (REGs), each of which is distributed within a control region on the basis of cell ID. One REG includes four REs. A structure of the REG will be described in more detail with reference to FIG. 5.

A set of OFDM symbols available for the PDCCH at a subframe is given by the following Table.

TABLE 3

| Subframe | Number of OFDM symbols for PDCCH when $N^{DL}_{RB} > 10$ | Number of OFDM symbols for PDCCH when $N^{DL}_{RB} \leq 10$ |
| --- | --- | --- |
| Subframe 1 and 6 for frame structure type 2 | 1, 2 | 2 |
| MBSFN subframes on a carrier supporting PDSCH, configured with 1 or 2 cell-specfic antenna ports | 1, 2 | 2 |
| MBSFN subframes on a carrier supporting PDSCH, configured with 4 cell-specific antenna ports | 2 | 2 |
| Subframes on a carrier not supporting PDSCH | 0 | 0 |
| Non-MBSFN subframes (except subframe 6 for frame structure type 2) configured with positioning reference signals | 1, 2, 3 | 2, 3 |
| All other cases | 1, 2, 3 | 2, 3, 4 |

A subset of downlink subframes within a radio frame on a carrier for supporting PDSCH transmission may be configured as MBSFN subframe(s) by a higher layer. Each MBSFN subframe is divided into a non-MBSFN region and an MBSFN region. The non-MBSFN region spans first one or two OFDM symbols, and its length is given by Table 3. The same CP as cyclic prefix (CP) used for subframe 0 is used for transmission within the non-MBSFN region of the MBSFN subframe. The MBSFN region within the MBSFN subframe is defined as OFDM symbols which are not used in the non-MBSFN region.

The PCFICH carries a control format indicator (CFI), which indicates any one of values of 1 to 3. For a downlink system bandwidth $N^{DL}_{RB} > 10$, the number 1, 2 or 3 of OFDM symbols which are spans of DCI carried by the CFI is given by the PDCCH. For a downlink system bandwidth $N^{DL}_{RB} \leq 10$, the number 2, 3 or 4 of OFDM symbols which are spans of DCI carried by the PDCCH is given by CFI+1. The CFI is coded in accordance with the following Table.

TABLE 4

| CFI | CFI code word $<b_0, b_1, \ldots, b_{31}>$ |
| --- | --- |
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |

TABLE 4-continued

| CFI | CFI code word $<b_0, b_1, \ldots, b_{31}>$ |
| --- | --- |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

The PHICH carries a HARQ (Hybrid Automatic Repeat Request) ACK/NACK (acknowledgment/negative-acknowledgment) signal as a response to UL transmission. The PHICH includes three REGs, and is scrambled cell-specifically. ACK/NACK is indicated by 1 bit, and the ACK/NACK of 1 bit is repeated three times. Each of the repeated ACK/NACK bits is spread by a spreading factor (SF) 4 or 2 and then mapped into a control region.

The control information transmitted through the PDCCH will be referred to as downlink control information (DCI). The DCI includes resource allocation information for a UE or UE group and other control information. Transmit format and resource allocation information of a downlink shared channel (DL-SCH) is referred to as DL scheduling information or DL grant. Transmit format and resource allocation information of an uplink shared channel (UL-SCH) is referred to as UL scheduling information or UL grant. The size and usage of the DCI carried by one PDCCH are varied depending on DCI formats. The size of the DCI may be varied depending on a coding rate. In the current 3GPP LTE system, various formats are defined, wherein formats 0 and 4 are defined for a UL, and formats 1, 1A, 1B, 1C, 1D, 2, 2A, 2B, 2C, 3 and 3A are defined for a DL. Combination selected from control information such as a hopping flag, RB allocation, modulation coding scheme (MCS), redundancy version (RV), new data indicator (NDI), transmit power control (TPC), cyclic shift, cyclic shift demodulation reference signal (DM RS), UL index, channel quality information (CQI) request, DL assignment index, HARQ process number, transmitted precoding matrix indicator (TPMI), and precoding matrix indicator (PMI) information is transmitted to the UE as the DCI. The following table shows examples of DCI formats.

TABLE 5

| DCI format | Description |
| --- | --- |
| 0 | Resource grants for the PUSCH transmissions (uplink) |
| 1 | Resource assignments for single codeword PDSCH transmissions |
| 1A | Compact signaling of resource assignments for single codeword PDSCH |
| 1B | Compact signaling of resource assignments for single codeword PDSCH |
| 1C | Very compact resource assignments for PDSCH (e.g. paging/broadcast system information) |
| 1D | Compact resource assignments for PDSCH using multi-user MIMO |
| 2 | Resource assignments for PDSCH for closed-loop MIMO operation |
| 2A | Resource assignments for PDSCH for open-loop MIMO operation |
| 2B | Resource assignments for PDSCH using up to 2 antenna ports with UE-specific reference signals |
| 2C | Resource assignment for PDSCH using up to 8 antenna ports with UE-specific reference signals |
| 3/3A | Power control commands for PUCCH and PUSCH with 2-bit/1-bit power adjustments |
| 4 | Scheduling of PUSCH in one UL Component Carrier with multi-antenna port transmission mode |

A plurality of PDCCHs may be transmitted within a control region. A UE may monitor the plurality of PDCCHs. An eNB determines a DCI format depending on the DCI to be transmitted to the UE, and attaches cyclic redundancy check (CRC) to the DCI. The CRC is masked (or scrambled) with an identifier (for example, a radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at a bit level.

The PDCCH is allocated to first m number of OFDM symbol(s) within a subframe. In this case, m is an integer of 1 or more, and is indicated by the PCFICH.

The PDCCH is transmitted on an aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped to each REG. A resource element (RE) occupied by the reference signal (RS) is not included in the REG. Accordingly, the number of REGs within given OFDM symbols is varied depending on the presence of the RS. The REGs are also used for other downlink control channels (that is, PDFICH and PHICH).

CCEs available for PDCCH transmission in the system may be numbered from 0 to $N_{CCE}-1$, wherein $N_{CCE}$=floor ($N_{REG}/9$), and $N_{REG}$ denotes the number of REGs which are not allocated to the PCFICH or the PHICH.

The number of DCI formats and DCI bits are determined in accordance with the number of CCEs. The CCEs are numbered and consecutively used. To simplify the decoding process, a PDCCH having a format including n CCEs may be initiated from only CCEs having numbers corresponding to multiples of n. The number of CCEs used for transmission of a specific PDCCH is determined by a network or the eNB in accordance with a channel status. For example, one CCE may be required for a PDCCH for a UE (for example, adjacent to eNB) having a good downlink channel. However, in case of a PDCCH for a UE (for example, located near the cell edge) having a poor channel, eight CCEs may be required to obtain sufficient robustness. Additionally, a power level of the PDCCH may be adjusted to correspond to a channel status.

The eNB transmits an actual PDCCH (DCI) on a PDCCH candidate in a search space, and the UE monitors the search space to detect the PDCCH (DCI). In this case, monitoring implies attempting to decode each PDCCH in the corresponding search space in accordance with all monitored DCI formats. The UE may detect its PDCCH by monitoring a plurality of PDCCHs. Basically, the UE does not know the location at which a PDCCH thereof is transmitted. Therefore, the UE attempts to decode all PDCCHs of the corresponding DCI format for each subframe until a PDCCH having an ID thereof is detected. This process is referred to as blind detection (or blind decoding (BD)).

For example, it is assumed that a specific PDCCH is CRC-masked with a radio network temporary identity (RNTI) 'A' and information about data transmitted using a radio resource 'B' (e.g., frequency location) and using transport format information 'C' (e.g., transmission block size, modulation scheme, coding information, etc.) is transmitted in a specific DL subframe. Then, the UE monitors the PDCCH using RNTI information thereof. The UE having the RNTI 'A' detects the PDCCH and receives the PDSCH indicated by 'B' and 'C' through information of the received PDCCH.

FIG. 5 illustrates a resource unit used to configure a downlink control channel.

FIG. 5(a) illustrates that the number of Tx antennas is 1 or 2, and FIG. 5(b) illustrates that the number of Tx antennas is 4. Resource units related to a control channel are configured in the same manner, although a different CRS pattern is used according to the number of Tx antennas. Referring to FIG. 5, a resource unit for a control channel is an REG. The REG includes four adjacent REs except for CRSs. That is, the REG includes the other REs except RE marked with any one of R0 to R3 in FIG. 5. A PFICH and a PHICH include 4 REGs and 3 REGs, respectively. A PDCCH is configured in a unit of CCEs, each CCE including 9 REGs. Although REGs configuring CCE are illustrated as being adjacent to one another in FIG. 5, 9 REGs configuring CCE may be distributed on a frequency axis and/or time axis in a control region.

Figure 6:
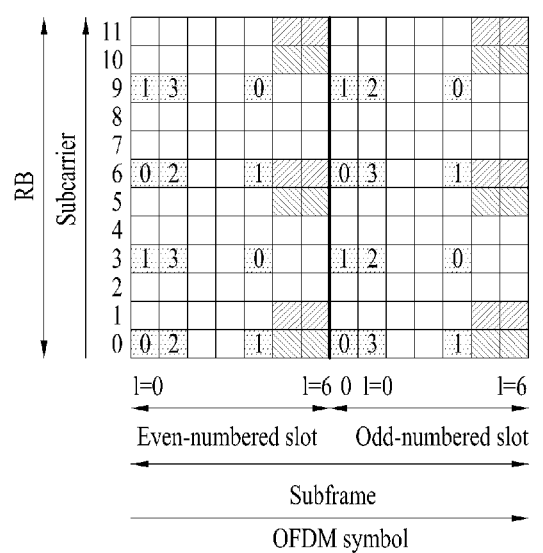
FIG. 6 illustrates an example of a cell specific reference signal (CRS) and a UE specific reference signal (UE-RS)

FIG. 6 illustrates cell specific reference signals (CRSs) and user specific reference signals (UE-RS). In particular, FIG. 6 shows REs occupied by the CRS(s) and UE-RS(s) on an RB pair of a subframe having a normal CP.

In the legacy 3GPP system, since CRSs are used for both demodulation and measurement, the CRSs are transmitted over a full downlink bandwidth in all DL subframes in a cell supporting PDSCH transmission and are transmitted through all antenna ports configured for an eNB.

Referring to FIG. 6, the CRSs are transmitted through antenna ports p=0, p=0, 1, and p=0, 1, 2, 3 in accordance with the number of antenna ports of a transmission mode. The CRSs are fixed at a certain pattern within a subframe regardless of a control region and a data region. A control channel is allocated to a resource of the control region, to which no CRS is allocated, and a data channel is also allocated to a resource of the data region, to which no CRS is allocated.

A UE may measure CSI using the CRSs and demodulate a signal received on a PDSCH in a subframe including the CRSs. That is, the eNB transmits the CRSs at predetermined locations of each RB in all RBs and the UE performs channel estimation based on the CRSs and then detects the PDSCH. For example, the UE may measure a signal received in a CRS RE and detect a PDSCH signal from an RE to which the PDSCH is mapped, using the measured signal and using the ratio of reception energy per CRS RE to reception energy per PDSCH mapped RE. However, when the PDSCH is transmitted based on the CRSs, since the eNB should transmit the CRSs with respect to all RBs, unnecessary RS overhead occurs. To solve such a problem, in a 3GPP LTE-A system, a UE-specific RS (hereinafter, UE-RS) and a CSI-RS are further defined in addition to a CRS. The UE-RS is used for demodulation and the CSI-RS is used to derive CSI. The UE-RS may be a kind of a DRS. Since the UE-RS and the CRS are used for demodulation, the UE-RS and the CRS may be regarded as demodulation RSs in terms of usage. Since the CSI-RS and the CRS are used for channel measurement or channel estimation, the CSI-RS and the CRS may be regarded as measurement RSs in terms of usage.

Referring to FIG. 6, the UE-RS is supported for transmission of PDSCH, and is transmitted through antenna port(s) p=5, p=7, p=8 or p=7, 8, . . . , u+6 (where, u is the number of layers used for the PDSCH transmission). The UE-RS is present and is a valid reference for PDSCH demodulation only if the PDSCH transmission is associated with the corresponding antenna port. The UE-RS is transmitted only on RBs to which the corresponding PDSCH is mapped. That is, the UE-RS is configured to be transmitted only on RB(s) to which a PDSCH is mapped at a subframe in which the PDSCH is scheduled unlike CRSs configured to be transmitted every subframe irrespective of the presence of the PDSCH. Accordingly, overhead of the RS may be lowered compared to that of the CRS.

Meanwhile, the CSI-RS is a DL RS introduced in the 3GPP LTE-A system for the purpose of channel measurement. In the 3GPP LTE-A system, a plurality of CSI-RS configurations are defined for CSI-RS transmission.

Figure 7:
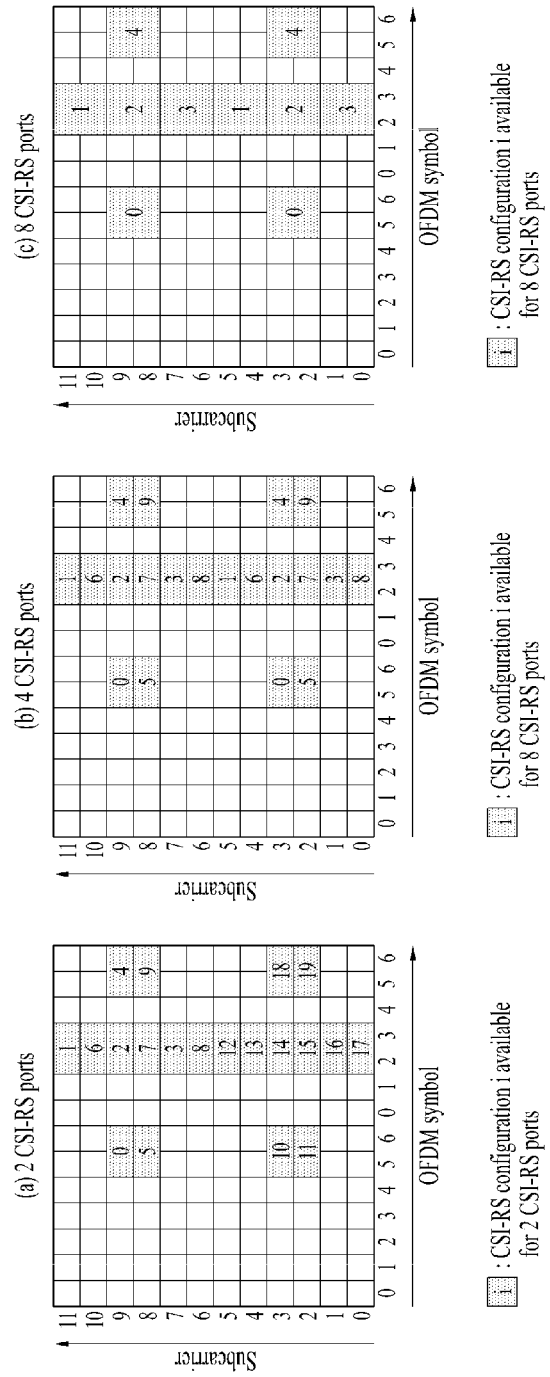
FIG. 7 illustrates an example of channel state information reference signal (CSI-RS) configurations.

FIG. 7 illustrates an example of channel state information reference signal (CSI-RS) configurations. Particularly, FIG. 7(a) illustrates 20 CSI-RS configurations 0 to 19 available for CSI-RS transmission through one or two CSI-RS ports among the CSI-RS configurations, FIG. 7(b) illustrates 10 available CSI-RS configurations 0 to 9 through four CSI-RS ports among the CSI-RS configurations, and FIG. 7(c) illustrates 5 available CSI-RS configurations 0 to 4 through 8 CSI-RS ports among the CSI-RS configurations. The CSI-RS ports refer to antenna ports configured for CSI-RS transmission. For example, antenna ports 15 to 22 correspond to the CSI-RS ports. Since CSI-RS configuration differs depending on the number of CSI-RS ports, if the number of antenna ports configured for CSI-RS transmission differs, the same CSI-RS configuration number may correspond to different CSI-RS configurations.

Unlike the CRS configured to be transmitted every subframe, the CSI-RS is configured to be transmitted at a predetermined transmission period corresponding to a plurality of subframes. Accordingly, CSI-RS configurations vary not only with the locations of REs occupied by CSI-RSs in an RB pair according to Table 8 or Table 9 but also with subframes in which CSI-RSs are configured. That is, if subframes for CSI-RS transmission differ even when CSI-RS configuration numbers are the same, CSI-RS configurations also differ. For example, if CSI-RS transmission periods $T_{CSI-RS}$ differ or if starting subframes $\Delta_{CSI-RS}$ in which CSI-RS transmission is configured in one radio frame differ, this may be considered as different CSI-RS configurations. Hereinafter, in order to distinguish between a CSI-RS configuration to which a CSI-RS configuration number is given and a CSI-RS configuration varied depending on a CSI-RS configuration number, the number of CSI-RS ports, and/or a CSI-RS configured subframe, the latter CSI-RS configuration will be referred to as a CSI-RS resource configuration.

When informing a UE of the CSI-RS resource configuration, an eNB may inform the UE of information about the number of antenna ports used for transmission of CSI-RSs, a CSI-RS pattern, CSI-RS subframe configuration $I_{CSI-RS}$, UE assumption on reference PDSCH transmitted power for CSI feedback $P_c$, a zero-power CSI-RS configuration list, a zero-power CSI-RS subframe configuration, etc.

The CSI-RS subframe configuration $I_{CSI-RS}$ is information for specifying subframe configuration periodicity $T_{CSI-RS}$ and subframe offset $\Delta_{CSI-RS}$ regarding occurrence of the CSI-RSs. The following table shows the CSI-RS subframe configuration $I_{CSI-RS}$ according to $T_{CSI-RS}$ and $\Delta_{CSI-RS}$.

TABLE 6

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

Subframes satisfying $\{10n_f+\text{floor}(n_s/2)-\Delta_{CSI-RS}\}$ mod $T_{CSI-RS}=0$ (where, $n_f$ is a radio frame number and $n_s$ is a slot number within a radio frame) are subframes including CSI-RSs.

$P_c$ is a ratio of PDSCH EPRE to CSI-RS EPRE assumed by the UE when the UE derives CSI for CSI feedback. EPRE means energy per resource element. The CSI-RS EPRE means energy per RE occupied by the CSI-RS, and PDSCH EPRE means energy occupied by the PDSCH.

The zero-power CSI-RS configuration list denotes CSI-RS pattern(s) in which the UE should assume zero transmission power. For example, since the eNB will transmit signals at zero transmission power on REs included in CSI-RS configurations indicated as zero transmission power in the zero power CSI-RS configuration list, the UE may assume signals received on the corresponding REs as interference or decode DL signals except for the signals received on the corresponding REs. The zero power CSI-RS configuration list may be a 16-bit bitmap corresponding one by one to 16 CSI-RS patterns for four antenna ports. In the 16-bit bitmap, the most significant bit corresponds to a CSI-RS configuration of the lowest CSI-RS configuration number (or, called a CSI-RS configuration index) and subsequent bits correspond to CSI-RS patterns in an ascending order. The UE assumes zero transmission power with respect to REs of a CSI-RS pattern corresponding to bit(s) set to '1' in the 16-bit zero power CSI-RS bitmap configured by a higher layer. Hereinafter, a CSI-RS pattern in which the UE should assume zero transmission power will be referred to as a zero power CSI-RS pattern.

A zero power CSI-RS subframe configuration is information for specifying subframes including the zero power CSI-RS pattern. Like the CSI-RS subframe configuration, a subframe including the presence of the zero power CSI-RS may be configured for the UE by using $I_{CSI-RS}$ according to Table 6. The UE may assume that subframes satisfying $\{10n_f+\text{floor}(n_s/2)-\Delta_{CSI-RS}\}\text{mod}T_{CSI-RS}=0$ include the zero power CSI-RS pattern. $I_{CSI-RS}$ may be separately configured with respect to a CSI-RS pattern in which the UE should assume non-zero transmission power and a zero power CSI-RS pattern in which the UE should assume zero transmission power, on REs.

The UE configured for a transmission mode (e.g., transmission mode 9 or other newly defined transmission modes) according to the 3GPP LTE-A system may perform channel measurement using a CSI-RS and demodulate or decode a PDSCH using a UE-RS.

Figure 8:
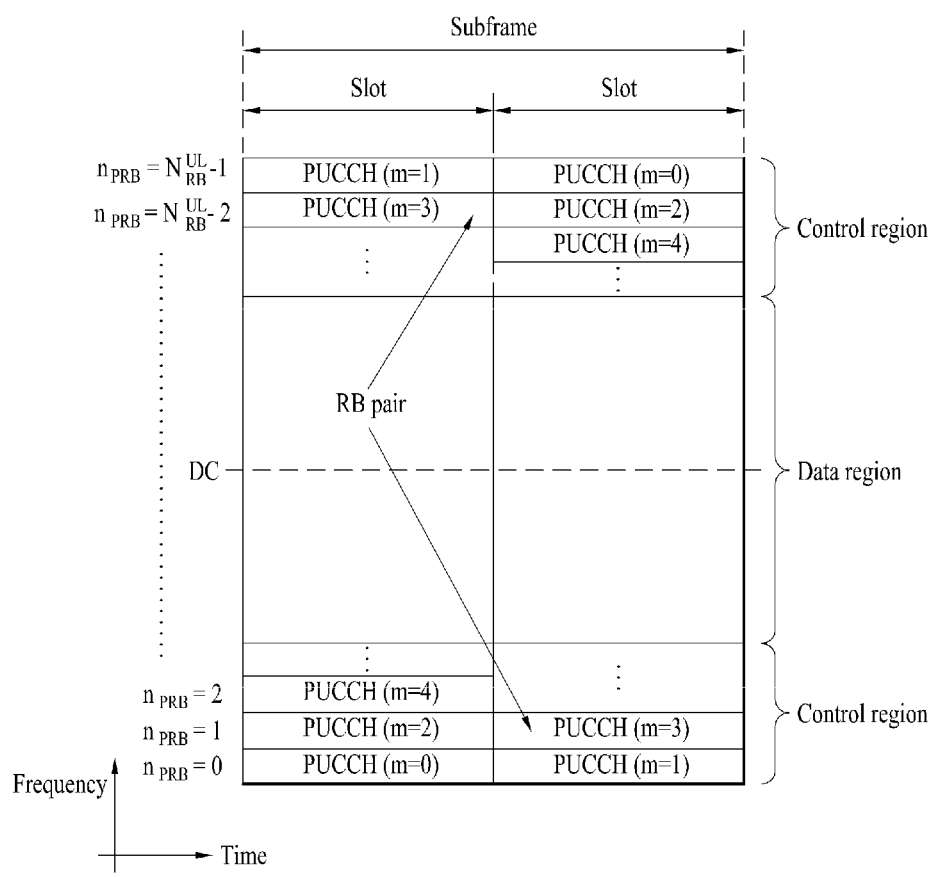
FIG. 8 illustrates a UL subframe structure used in a wireless communication system.

FIG. 8 illustrates an example of a UL subframe structure used in a wireless communication system.

Referring to FIG. 8, a UL subframe may be divided into a data region and a control region in the frequency domain. One or several PUCCHs may be allocated to the control region to carry uplink control information (UCI). One or several PUSCHs may be allocated to the data region of the UL subframe to carry user data.

In the UL subframe, subcarriers distant from a direct current (DC) subcarrier are used as the control region. In other words, subcarriers located at both ends of a UL transmission BW are allocated to transmit UCI. A DC subcarrier is a component unused for signal transmission and is mapped to a carrier frequency $f_0$ in a frequency up-conversion process. A PUCCH for one UE is allocated to an RB pair belonging to resources operating on one carrier frequency and RBs belonging to the RB pair occupy different subcarriers in two slots. The PUCCH allocated in this way is expressed by frequency hopping of the RB pair allocated to the PUCCH over a slot boundary. If frequency hopping is not applied, the RB pair occupies the same subcarriers.

The PUCCH may be used to transmit the following control information.

Scheduling request (SR): SR is information used to request a UL-SCH resource and is transmitted using an on-off keying (OOK) scheme.

HARQ-ACK: HARQ-ACK is a response to a PDCCH and/or a response to a DL data packet (e.g., a codeword) on a PDSCH. HARQ-ACK indicates whether the PDCCH or PDSCH has been successfully received. 1-bit HARQ-ACK is transmitted in response to a single DL codeword and 2-bit HARQ-ACK is transmitted in response to two DL codewords. A HARQ-ACK response includes a positive ACK (simply, ACK), negative ACK (NACK), discontinuous transmission (DTX), or NACK/DRX. In this case, HARQ-ACK is used interchangeably with HARQ ACK/NACK and ACK/NACK.

Channel state information (CSI): CSI is feedback information for a DL channel CSI may include channel quality information (CQI), a precoding matrix indicator (PMI), a precoding type indicator, and/or a rank indicator (RI). In the CSI, MIMO-related feedback information includes the RI and the PMI. The RI indicates the number of streams or the number of layers that may be received by the UE through the same time-frequency resource. The PMI is a value reflecting a space characteristic of a channel and indicates an index of a UE's preferred precoding matrix for DL signal transmission based on a metric such as an SINR. The CQI is a value of channel strength, and indicates a received SINR that may be obtained by the UE generally when the eNB uses the PMI.

A general wireless communication system performs data transmission/reception through one downlink (DL) band and through one uplink (UL) band corresponding to the DL band (in case of a frequency division duplex (FDD) mode), or divides a predetermined radio frame into a UL time unit and a DL time unit in the time domain and then performs data transmission/reception through the UL/DL time unit (in case of a time division duplex (TDD) mode). Recently, to use a wider frequency band in recent wireless communication systems, the introduction of carrier aggregation (or BW aggregation) technology that uses a wider UL/DL BW by aggregating a plurality of UL/DL frequency blocks has been discussed. A carrier aggregation (CA) is different from an orthogonal frequency division multiplexing (OFDM) system in that DL or UL communication is performed using a plurality of carrier frequencies, whereas the OFDM system carries a base frequency band divided into a plurality of orthogonal subcarriers on a single carrier frequency to perform DL or UL communication. Hereinafter, each of carriers aggregated by carrier aggregation will be referred to as a component carrier (CC).

For example, three 20 MHz CCs may be aggregated on each of a UL and a DL to support a bandwidth of 60 MHz. The respective CCs may be contiguous or non-contiguous in the frequency domain. For convenience, although it has been described that the bandwidth of UL CC and the bandwidth of DL CC are the same as each other and symmetric to each other, the bandwidth of each CC may be determined independently. Also, asymmetrical carrier aggregation in which the number of UL CCs is different from the number of DL CCs may be implemented. DL/UL CC limited to a specific UE may be referred to as a serving UL/DL CC configured for the specific UE.

Meanwhile, the 3GPP LTE-A standard uses the concept of a cell to manage radio resources. The "cell" associated with the radio resources is defined by combination of downlink resources and uplink resources, that is, combination of DL CC and UL CC. The cell may be configured by downlink resources only, or may be configured by downlink resources and uplink resources. If carrier aggregation is supported, linkage between a carrier frequency of the downlink resources (or DL CC) and a carrier frequency of the uplink resources (or UL CC) may be indicated by system information. For example, combination of the DL resources and the UL resources may be indicated by linkage of system information block type 2 (SIB2). In this case, the carrier frequency means a center frequency of each cell or CC. A cell operating on a primary frequency may be referred to as a primary cell (Pcell) or PCC, and a cell operating on a secondary frequency may be referred to as a secondary cell (Scell) or SCC. The carrier corresponding to the Pcell on downlink will be referred to as a downlink primary CC (DL PCC), and the carrier corresponding to the Pcell on uplink will be referred to as an uplink primary CC (UL PCC). A Scell means a cell that may be configured after completion of radio resource control (RRC) connection establishment and used to provide additional radio resources. The Scell may form a set of serving cells for the UE together with the Pcell in accordance with capabilities of the UE. The carrier corresponding to the Scell on the downlink will be referred to as downlink secondary CC (DL SCC), and the carrier corresponding to the Scell on the uplink will be referred to as uplink secondary CC (UL SCC). Although the UE is in RRC-CONNECTED state, if it is not configured by carrier aggregation or does not support carrier aggregation, a single serving cell configured by the Pcell only exists.

The eNB may activate all or some of the serving cells configured for the UE or deactivate some of the serving cells for communication with the UE. The eNB may change the activated/deactivated cell(s), and may change the number of cells which is/are activated or deactivated. If the eNB allocates available cells to the UE cell-specifically or UE-specifically, at least one of the allocated cells is not deactivated unless cell allocation to the UE is fully reconfigured or unless the UE performs handover. Such a cell which is not deactivated unless CC allocation to the UE is fully reconfigured will be referred to as Pcell, and a cell which may be activated/deactivated freely by the eNB will be referred to as Scell. The Pcell and the Scell may be discriminated from each other on the basis of the control information. For example, specific control information may be set to be transmitted and received through a specific cell only. This specific cell may be referred to as the Pcell, and the other cell(s) may be referred to as Scell(s).

A configured cell refers to a cell, in which carrier aggregation is performed for a UE based on measurement report from another eNB or UE, among cells of an eNB and is configured per UE. The cell configured for the UE may be a serving cell in terms of the corresponding UE. For the cell configured for the UE, i.e. the serving cell, resources for ACK/NACK transmission for PDSCH transmission are reserved in advance. An activated cell refers to a cell configured to be actually used for PDSCH/PUSCH transmission among cells configured for the UE, and CSI reporting and SRS transmission for PDSCH/PUSCH transmission are performed in the activated cell. A deactivated cell refers to a cell configured not to be used for PDSCH/PUSCH transmission by the command of an eNB or the operation of a timer and, if a cell is deactivated, CSI reporting and SRS transmission are also stopped in the cell.

For reference, a carrier indicator (CI) denotes a serving cell index (ServCellIndex), CI=0 is applied to Pcell. The serving cell index is a short ID used to identify a serving cell. For example, any one of integers from 0 to 'maximum number of carrier frequencies which can be configured for the UE at a time −1' may be allocated to one serving cell as the serving cell index. That is, the serving cell index may be a logical index used to identify a specific serving cell among cells allocated to the UE rather than a physical index used to identify a specific carrier frequency among all carrier frequencies.

As described above, the term "cell" used in carrier aggregation is differentiated from the term "cell" indicating a certain geographical area where a communication service is provided by one eNB or one antenna group.

The cell mentioned in the present invention means a cell of carrier aggregation which is combination of UL CC and DL CC unless specifically noted.

Meanwhile, since one serving cell is only present in case of communication based on a single carrier, a PDCCH carrying UL/DL grant and corresponding PUSCH/PDSCH are transmitted from one cell. In other words, in case of FDD under a single carrier status, a PDCCH for a DL grant for a PDSCH, which will be transmitted from a specific DL CC, is transmitted from the specific CC, and a PDSCH for a UL grant for a PUSCH, which will be transmitted from a specific UL CC, is transmitted from a DL CC linked to the specific UL CC. In case of TDD under a single carrier status, a PDCCH for a DL grant for a PDSCH, which will be transmitted from a specific DL CC, is transmitted from the specific CC, and a PDSCH for a UL grant for a PUSCH, which will be transmitted from a specific UL CC, is transmitted from the specific CC.

On the contrary, since a plurality of serving cells may be configured in a multi-carrier system, transmission of UL/DL grant from a serving cell having a good channel status may be allowed. In this way, if a cell carrying UL/DL grant which is scheduling information is different from a cell where UL/DL transmission corresponding to the UL/DL grant is performed, this will be referred to as cross-carrier scheduling.

Hereinafter, the case where the cell is scheduled from itself and the case where the cell is scheduled from another cell will be referred to as self-CC scheduling and cross-CC scheduling, respectively.

For data transmission rate enhancement and stable control signaling, the 3GPP LTE/LTE-A may support aggregation of a plurality of CCs and a cross carrier-scheduling operation based on the aggregation.

If cross-carrier scheduling (or cross-CC scheduling) is applied, a PDCCH for downlink allocation for a DL CC B or DL CC C, that is, carrying a DL grant may be transmitted to a DL CC A, and a corresponding PDSCH may be transmitted to the DL CC B or DL CC C. For cross-CC scheduling, a carrier indicator field (CIF) may be introduced. The presence or absence of the CIF within the PDCCH may be configured semi-statically and UE-specifically (or UE-group-specifically) by higher layer signaling (e.g., RRC signaling).

Figure 9:
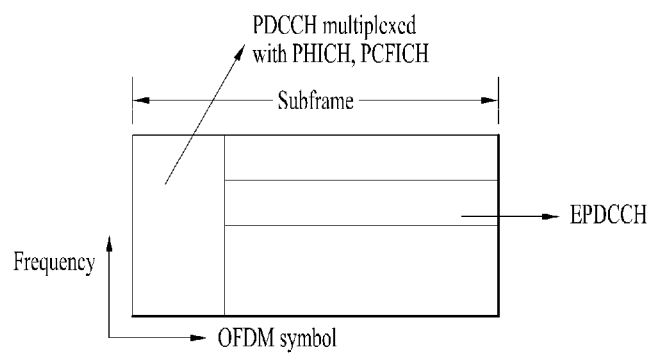
FIG. 9 illustrates a downlink control channel configured in a data region of a downlink subframe.

FIG. 9 illustrates a downlink control channel configured in a data region of a downlink subframe.

Meanwhile, if RRH technology, cross-carrier scheduling technology, etc. are introduced, the amount of PDCCH which should be transmitted by the eNB is gradually increased. However, since a size of a control region to which the PDCCH may be transmitted is the same as before, PDCCH transmission acts as a bottleneck of system throughput. Although channel quality may be improved by the introduction of the aforementioned multi-node system, application of various communication schemes, etc., the introduction of a new control channel is required to apply the legacy communication scheme and the carrier aggregation technology to a multi-node environment. Due to the need, a configuration of a new control channel in a data region (hereinafter, referred to as PDSCH region) not the legacy control region (hereinafter, referred to as PDCCH region) has been discussed. Hereinafter, the new control channel will be referred to as an enhanced PDCCH (hereinafter, referred to as EPDCCH).

The EPDCCH may be configured for rear OFDM symbols starting from a configured OFDM symbol, instead of front OFDM symbols of a subframe. The EPDCCH may be configured using continuous frequency resources, or may be configured using discontinuous frequency resources for frequency diversity. By using the EPDCCH, control information per node may be transmitted to a UE, and a problem that a legacy PDCCH region may not be sufficient may be solved. For reference, the PDCCH may be transmitted through the same antenna port(s) as that (those) configured for transmission of a CRS, and a UE configured to decode the PDCCH may demodulate or decode the PDCCH by using the CRS. Unlike the PDCCH transmitted based on the CRS, the EPDCCH is transmitted based on the demodulation RS (hereinafter, DMRS). Accordingly, the UE may decode/demodulate the PDCCH based on the CRS and decode/demodulate the EPDCCH based on the DMRS. The DMRS associated with EPDCCH is transmitted on the same antenna port $p\in\{107, 108, 109, 110\}$ as the EPDCCH physical resource, is present for EPDCCH demodulation only if the EPDCCH is associated with the corresponding antenna port, and is transmitted only on the PRB(s) to which the corresponding EPDCCH is mapped. For example, the REs occupied by the UE-RS(s) of the antenna port 7 or 8 may be occupied by the DMRS(s) of the antenna port 107 or 108 on the PRB to which the EPDCCH is mapped, and the REs occupied by the UE-RS(s) of antenna port 9 or 10 may be occupied by the DMRS(s) of the antenna port 109 or 110 on the PRB to which the EPDCCH is mapped. In other words, a certain number of REs are used on each RB pair for transmission of the DMRS for demodulation of the EPDCCH regardless of the UE or cell if the type of EPDCCH and the number of layers are the same as in the case of the UE-RS for demodulation of the PDSCH.

For each serving cell, higher layer signaling may configure a UE with one or two EPDCCH-PRB-sets for EPDCCH monitoring. The PRB-pairs corresponding to an EPDCCH-PRB-set are indicated by higher layers. Each EPDCCH-PRB-set consists of a set of ECCEs numbered from 0 to $N_{ECCE,p,k}-1$, where $N_{ECCE,p,k}$ is the number of ECCEs in EPDCCH-PRB-set p of subframe k. Each EPDCCH-PRB-set may be configured for either localized EPDCCH transmission or distributed EPDCCH transmission.

The UE monitors a set of EPDCCH candidates on one or more activated serving cells as configured by higher layer signaling for control information.

The set of EPDCCH candidates to be monitored are defined in terms of EPDCCH UE-specific search spaces. For each serving cell, the subframes in which the UE monitors EPDCCH UE-specific search spaces are configured by higher layers.

The UE does not monitor the EPDCCH at the following subframes:
- special subframes for special subframe configurations 0 and 5 of Table 2 in case of TDD and normal downlink CP;
- subframes for special subframe configurations 0, 4 and 7 of Table 2 in case of TDD and extended downlink CP;
- subframes indicated to decode a physical multicast channel (PMCH) by higher layer;
- the same downlink subframe on the Scell when a downlink subframe on the Pcell is a special subframe and the UE cannot perform simultaneous transmission and reception on the Pcell and Scell if the UE is configured by UL/DL configurations for the Pcell and Scell.

An EPDCCH UE-specific search space $ES^{(L)}_k$ at aggregation level $L \in \{1, 2, 4, 8, 16, 32\}$ is defined by a set of EPDCCH candidates. For an EPDCCH-PRB-set p configured for distributed transmission, ECCEs corresponding to EPDCCH candidate m of the search space $ES^{(L)}_k$ are given by the following equation.

Equation 1

$$L\{(Y_{p,k}+m') \bmod \lfloor N_{ECCE,p,k}/L \rfloor\}+i \quad \text{[Equation 1]}$$

For an EPDCCH-PRB-set p configured for distributed transmission, ECCEs corresponding to EPDCCH candidate m of the search space $ES^{(L)}_k$ are given by the following equation.

Equation 2

$$L\left\{\left(Y_{p,k}+\left\lfloor\frac{m \cdot N_{ECCE,p,k}}{L \cdot M^{(L)}_p}\right\rfloor+b\right) \bmod \lfloor N_{ECCE,p,k}/L\rfloor\right\}+i \quad \text{[Equation 2]}$$

In this case, $i=0, \ldots, L-1$. $b=n_{CI}$ if the UE is configured with a carrier indicator field for the serving cell on which EPDCCH is monitored, otherwise $b=0$. $n_{CI}$ is a carrier indicator field (CIF) value, which is the same as a serving cell index (ServCellIndex). $m=0, 1, \ldots, M^{(L)}_p-1$, $M^{(L)}_p$ is the number of EPDCCH candidates to be monitored at aggregation level L in EPDDCH-PRB-set p. The variable $Y_{p,k}$ is defined by '$Y_{p,k}=(A_p \cdot Y_{p,k-1}) \bmod D$', where $Y_{p,k-1}=n_{RNTI}\neq 0$, $A_0=39827$, $A_0=39829$, $D=65537$ and $k=\text{floor}(n_s/2)$. $n_s$ is the slot number within a radio frame.

The UE does not monitor the EPDCCH candidate, if an ECCE corresponding to the EPDCCH candidate is mapped to a PRB pair that overlaps in frequency with a transmission of either PBCH or PSS/SSS at the same subframe.

The EPDCCH is transmitted using an aggregation of one or several consecutive enhanced control channel elements (ECCEs). Each ECCE consists of multiple enhanced resource element groups (EREGs). EREGs are used for defining the mapping of enhanced control channels to REs. There are 16 REGs, numbered from 0 to 15, per physical resource block (PRB) pair comprised of PRB within a first slot of one subframe and PRB within a second slot thereof. Among REs within the PRB pair, the other REs except REs carrying DMRS (hereinafter, EPDCCH DMRS) for demodulation of the EPDCCH are numbered in an increasing order of frequency and then numbered cyclically from 0 to 15 in an increasing order of time. Then, all the REs, except the REs carrying the EPDCCH DMRS, in the PRB pair have any one of numbers 0 to 15. All REs with the same number i in the PRB pair constitute EREG number i. As described above, it is noted that EREGs are distributed on frequency and time axes within the PRB pair and EPDCCHs transmitted using aggregation of one or more ECCEs, each of which includes a plurality of EREGs, are also located by being distributed on frequency and time axes within the PRB pair.

The number of ECCEs used for one EPDCCH depends on the EPDCCH format as given by Table 7, and the number of EREGs per ECCE is given by Table 8. Table 7 shows an example of supported EPDCCH formats, and Table 8 shows an example of the number $N^{EREG}_{ECCE}$ of EREGs per ECCE. Both localized transmission and distributed transmission are supported.

TABLE 7

| | Number of ECCEs for one EPDCCH, $N^{ECCE}_{EPDCCH}$ | | | |
|---|---|---|---|---|
| | Case A | | Case B | |
| EPDCCH format | Localized transmission | Distributed transmission | Localized transmission | Distributed transmission |
| 0 | 2 | 2 | 1 | 1 |
| 1 | 4 | 4 | 2 | 2 |
| 2 | 8 | 8 | 4 | 4 |
| 3 | 16 | 16 | 8 | 8 |
| 4 | — | 32 | — | 16 |

TABLE 8

| Normal cyclic prefix | | Extended cyclic prefix | |
|---|---|---|---|
| Normal subframe | Special subframe, configuration 3, 4, 8 | Special subframe, configuration 1, 2, 6, 7, 9 | Normal subframe | Special subframe, configuration 1, 2, 3, 5, 6 |
| 4 | | | 8 | |

The EPDCCH may use either localized or distributed transmission, which differ depending on mapping of ECCEs to EREGs and PRB pairs. One or two sets of PRB pairs, in which the UE monitors EPDCCH transmission, may be configured. All EPDCCH candidates in EPDCCH set $S_p$ (i.e., EPDCCH-PRB-set) use either only localized transmission or only distributed transmission as configured by higher layers. Within EPDCCH set $S_p$ at subframe k, the ECCEs available for transmission of EPDCCHs are numbered from 0 to $N_{ECCE,p,k}-1$. ECCE number n corresponds to the following EREG(s):

- EREGs numbered with $(n \bmod N^{ECCE}_{RB}) + jN^{ECCE}_{RB}$ in PRB index floor$(n/N^{ECCE}_{RB})$ for localized mapping; and
- EREGs numbered in PRB indexes $(n+j\max(1, N^{Sp}_{RB}/N^{EREG}_{ECCE})) \bmod N^{Sp}_{RB}$ for distributed mapping, where $j=0, 1, \ldots, N^{EREG}_{ECCE}-1$, $N^{EREG}_{ECCE}$ is the number of EREGs per ECCE, and $N^{ECCE}_{RB}=16/N^{EREG}_{ECCE}$ is the number of ECCEs per RB pair. The PRB pairs constituting EPDCCH set $S_p$ are assumed to be numbered in ascending order from 0 to $N^{Sp}_{RB}-1$.

Case A in Table 7 applies when:
- DCI format 2, 2A, 2B, 2C or 2D is used and $N^{DL}_{RB} \leq 25$, or
- any DCI format when $n_{EPDCCH} < 104$ and normal cyclic prefix is used at normal subframes or special subframes with special subframe configurations 3, 4, and 8.

Otherwise Case B is used. The quantity $n_{EPDCCH}$ for a specific UE is defined as the number of downlink resource elements (k,l), which fulfill all of the following criteria, in a PRB pair configured for possible EPDCCH transmission of EPDCCH set $S_0$, they are part of any one of the 16 EREGs in the physical resource-block pair, they are assumed by the UE not to be used for CRSs or CSI-RSs, the index l fulfilling $l \geq l_{EPDCCHStart}$ in a subframe, where $l_{EPDCCHStart}$ is given based on higher layer signaling 'epdcch-StartSymbol-r11', higher layer signaling 'pdsch-Start-r11', or CFI value carried by PCFICH.

The mapping of resource elements (k,l), which fulfil the criteria above, to antenna port p is in increasing order of the index k and then the index l, starting from the first slot and ending with the second slot in a subframe.

For localized transmission, the single antenna port p to be used is given by $n' = n_{ECCE,low} \mod N^{ECCE}_{RB} + n_{RNTI} \mod \min(N^{ECCE}_{EPDCCH}, N^{ECCE}_{RB})$ and Table 9, where $n_{ECCE}$ is the lowest ECCE index used by this EPDCCH transmission in the EPDCCH set, $n_{RNTI}$ corresponds to the RNTI associated with the EPDCCH transmission, and $N^{ECCE}_{EPDCCH}$ is the number of ECCEs used for the EPDCCH.

TABLE 9

| | Normal cyclic prefix | | |
| --- | --- | --- | --- |
| n' | Normal subframes, Special subframes, configurations 3, 4, 8 | Special subframes, configurations 1, 2, 6, 7, 9 | Extended cyclic prefix Any subframe |
| 0 | 107 | 107 | 107 |
| 1 | 108 | 109 | 108 |
| 2 | 109 | — | — |
| 3 | 110 | — | — |

For distributed transmission, each resource element in an EREG is associated with one out of two antenna ports in an alternating manner, where the antenna ports $p \in \{107, 109\}$ for normal cyclic prefix and the antenna ports $p \in \{107, 108\}$ for extended cyclic prefix.

Recently, machine type communication (MTC) has come to the fore as a significant communication standard issue. MTC refers to exchange of information between a machine and an eNB without involving persons or with minimal human intervention. For example, MTC may be used for data communication for measurement/sensing/reporting such as meter reading, water level measurement, use of a surveillance camera, inventory reporting of a vending machine, etc. and may also be used for automatic application or firmware update processes for a plurality of UEs. In MTC, the amount of transmission data is small and UL/DL data transmission or reception (hereinafter, transmission/reception) occurs occasionally. In consideration of such properties of MTC, it would be better in terms of efficiency to reduce production cost and battery consumption of UEs for MTC (hereinafter, MTC UEs) in accordance with a data transmission rate. Since the MTC UE has low mobility, the channel environment thereof remains substantially the same. If the MTC UE is used for metering, reading of a meter, surveillance, and the like, the MTC UE is very likely to be located in a place such as a basement, a warehouse, and mountain regions which the coverage of a typical eNB does not reach. In consideration of the purposes of the MTC UE, it is better for a signal for the MTC UE to have wider coverage than the signal for the conventional UE (hereinafter, legacy UE).

When considering the usage of the MTC UE, there is a high probability that the MTC UE requires a signal of wide coverage compared with the legacy UE. Therefore, if the eNB transmits a PDCCH, a PDSCH, etc. to the MTC UE using the same scheme as a scheme of transmitting the PDCCH, the PDSCH, etc. to the legacy UE, the MTC UE has a difficulty in receiving the PDCCH, the PDSCH, etc. Therefore, the present invention proposes that the eNB apply a coverage enhancement scheme such as subframe repetition (repetition of a subframe with a signal) or subframe bundling when transmitting a signal to the MTC UE having a coverage issue so that the MTC UE may effectively receive the signal transmitted from the eNB. For example, the PDCCH and PDSCH may be transmitted to the MTC UE having the coverage issue through a plurality of subframes (e.g., about 100 subframes).

Since the embodiments of the present invention described hereinafter relate to methods for coverage enhancement, the embodiments may be applied to another UE having a coverage issue as well as the MTC UE. Therefore, the embodiments of the present invention may be applied to a UE operating in a coverage enhancement mode. However, for convenience of description, a UE implemented to carry out the coverage enhancement method according to the present invention will be referred to as an MTC UE, and a UE which is not implemented to carry out the coverage enhancement method according to the present invention will be referred to a legacy UE.

Figure 10:
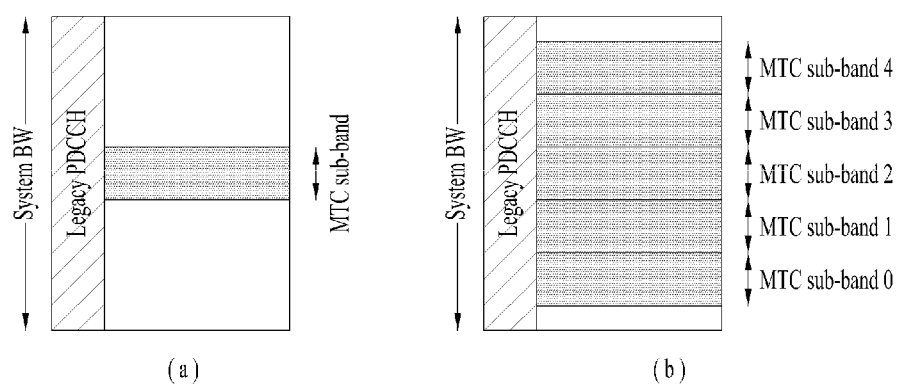
FIG. 10 illustrates an example of a signal band for MTC.

FIG. 10 illustrates an example of a signal band for MTC.

As one method for reducing the cost of the MTC UE, an operation of the MTC UE may be performed at a reduced UE downlink and uplink bandwidth of 1.4 MHz, for example, regardless of an operating system bandwidth of a cell. At this time, a sub-band for operating the MTC UE may always be located at the center (e.g., 6 center PRBs) of a cell as shown in FIG. 10(a), or several subbands for MTC may be provided for one subframe to multiplex MTC UEs as shown in FIG. 10(b), whereby the UEs may use their respective subbands different from each other or the UEs use the same subband not the subband of 6 center PRBs.

In this case, the MTC UE cannot receive a legacy PDCCH transmitted through a full system band normally, and transmission of PDCCH for the MTC UE from an OFDM symbol region from which the legacy PDCCH is transmitted may not be preferable due to multiplexing issue with a PDCCH transmitted to another UE. As one method for solving this, it is required to introduce a control channel transmitted within a subband where MTC is operated for the MTC UE. As a downlink control channel for such a low-complexity MTC UE, the legacy EPDCCH may be used as it is. Or, M-PDCCH for the MTC UE, which is a control channel of a modified type of the legacy PDCCH/EPDCCH, may be introduced.

Hereinafter, in the present invention, a physical downlink control channel for the low-complexity MTC UE or normal complexity MTC UE will be referred to as EPDCCH, M-PDCCH, or MTC-PDCCH. In other words, EPDCCH, M-PDCCH and MTC-PDCCH are together used as terms indicating a physical downlink control channel transmitted in a data region of a subframe for low-complexity MTC UE or normal (MTC) UE.

Although the present invention describes that a downlink control channel is assumed to be used for an MTC UE as suggested, the suggested downlink control channel may be used for another normal UE not the MTC UE. Also, MTC-EPDCCH is hereinafter used to refer to M-PDCCH.

The present invention suggests that the legacy EPDCCH or the modified type EPDCCH of the legacy EPDCCH should be used. This may particularly be used for a downlink control channel of the low-complexity MTC UE operating through a reduced bandwidth as shown in FIG. 10.

Embodiment A. Configuration of MTC-SS

More resources should be used to transmit EPDCCH to an MTC UE which requires coverage enhancement (CE). However, in case of a low-complexity MTC UE of which receivable bandwidth is limited to 6 PRBs, the amount of EPDCCH resources that may be transmitted at one subframe is limited. Therefore, resources existing in a plurality of subframes may be used to transmit EPDCCH by using more resources. As a method for transmitting the EPDCCH, a search space (SS) for the MTC UE may be located over a plurality of subframes. Hereinafter, for such EPDCCH monitoring, a resource region existing over a plurality of subframes will be referred to as an MTC-EPDCCH-resource-set. Also, a search space where the UE monitors the EPDCCH within the corresponding MTC-EPDCCH-resource-set will be referred to as an MTC-SS.

FIG. 11 illustrates MTC-EPDCCH-resource set.

The MTC-EPDCCH-resource-set includes a plurality of subframes (e.g., M subframes) as shown in FIG. 11, each of which may include a plurality of PRBs (e.g., 6 PRBs). The EPDCCH may be transmitted to the UE through a resource within the MTC-EPDCCH-resource-set.

Subframes constituting the MTC-EPDCCH-resource-set may be contiguous or non-contiguous. That is, the MTC-EPDCCH-resource-set may be configured over contiguous subframes or non-contiguous subframes. For example, a special subframe (e.g., special subframe configuration 0) having a short DwPTS length may be excluded from the subframes constituting the MTC-EPDCCH-resource-set. A value of M which is the number of subframes constituting the MTC-EPDCCH-resource-set may be fixed, may be configured using SIB and/or higher-layer signaling by the eNB, or may be determined in accordance with a required EPDCCH coverage enhancement level of the UE.

PRB location within the subframes constituting the MTC-EPDCCH-resource-set may be maintained equally at all subframes. The PRB location within the subframes constituting the MTC-EPDCCH-resource-set may be varied per subframe. That is, the PRB location within the subframes constituting the MTC-EPDCCH-resource-set may be changed at a period of one subframe or a plurality of subframes. If the PRB location within the subframes constituting the MTC-EPDCCH-resource-set is changed at a period of a plurality of subframes, it means that the PRB location is maintained for a plurality of subframes of one period. As a change pattern of the number of PRBs and the PRB location within the subframe for a specific MTC-EPDCCH-resource-set, a predetermined pattern may be used, or the change pattern may be configured using higher layer signaling by the eNB.

Only one MTC-EPDCCH-resource-set for reception of the EPDCCH may exist at the same time. Alternatively, two or more MTC-EPDCCH-resource-sets may exist at the same time, for example, at the same subframe. The UE may monitor MTC-EPDCCH-resource-sets configured by different number of subframes at the same time, for example, at the same subframe. At this time, each MTC-EPDCCH-resource-set may have a respective M value and/or different number of PRBs (within the subframe). For example, a plurality of M values of the MTC-EPDCCH-resource-set to be monitored by one UE may exist. In other words, several candidate values may exist for the number M of subframes to be monitored by the UE as the MTC-EPDCCH-resource-set. In this case, MTC-EPDCCH-resource-set configured by a separate subframe set may exist depending on the value of M, and the UE should monitor all of the MTC-EPDCCH-resource-sets for the plurality of M values.

Embodiment B. Configuration of EPDCCH

In the legacy EPDCCH, one EPDCCH candidate includes ECCEs existing within one subframe. The number of ECCEs constituting one EPDCCH candidate is an aggregation level AL, and the EPDCCH candidate within the same EPDCCH search space may have various ALs. That is, the amount (e.g., the number of ECCEs) of resources constituting EPDCCH candidate is varied depending on the AL.

The EPDCCH transmitted through the MTC-EPDCCH-resource-set may also have various resources (e.g., the number of ECCEs) constituting one EPDCCH candidate. Hereinafter, the amount of resources constituting one EPDCCH candidate will be referred to as TAR (total aggregated resource). For example, the TAR may be the number of ECCEs constituting one EPDCCH (within the MTC-SS).

EPDCCH candidates within the MTC-EPDCCH-resource-set may have their respective TAR values different from each other. For example, one or more EPDCCH candidates having a TAR value of 10, which should be monitored by the UE, may exist within a UE MTC-EPDCCH-resource-set, and one or more EPDCCH candidates having a TAR value of 20 may exist.

Hereinafter, for convenience, EPDCCH candidate existing within the MTC-EPDCCH-resource-set will be referred to as MTC-EPDCCH candidate.

Option 1. A plurality of ECCEs configure one MTC-EPDCCH candidate.

FIG. 12 illustrates ECCE(s) that configures MTC-EPDCCH candidates according to the present invention.

N ECCEs existing in the MTC-EPDCCH-resource-set may configure one MTC-EPDCCH candidate. In this case, N is a value determined in accordance with a TAR value.

N ECCE resources configuring one MTC-EPDCCH candidate may be different N ECCEs among ECCE resources existing in the MTC-EPDCCH-resource-set. For example, if MTC-EPDCCH-resource-set comprised of 8 subframes exists and 4 ECCEs per subframe of the MTC-EPDCCH-resource-set exist as shown in FIG. 12, a total of 32 ECCEs may exist. One MTC-EPDCCH candidate may include a plurality of ECCEs selected from 32 ECCEs by a specific equation/correlation.

Alternatively, L ECCEs per subframe configuring the MTC-EPDCCH-resource-set may configure one MTC-EPDCCH candidate. That is, if the MTC-EPDCCH-resource-set is comprised of M subframes, a total of L*M ECCEs of L per subframe may configure one MTC-EPDCCH candidate.

ECCE Indexing

Methods for indexing ECCEs within MTC-EPDCCH-resource-set may be as follows.

Alt 1. As shown in FIG. 12(a), indexes may be given to ECCEs within each subframe. In this case, the same ECCE index may be given to ECCEs existing at different subframes. ECCEs of the same index existing at different subframes may be identified using subframe index.

Alt 2. As shown in FIG. 12(b), indexes may sequentially be given to ECCEs within one subframe from the first subframe. If the indexes are all given to the ECCEs within the subframe, the indexes may subsequently be given to ECCEs existing in next subframe. In this case, ECCEs existing in the MTC-EPDCCH-resource-set have their respective ECCE indexes different from each other. Therefore, the ECCEs existing in the MTC-EPDCCH-resource-set may mutually be identified from one another by ECCE indexes only.

Alt 3. As shown in FIG. 12(c), indexes may be given to ECCEs in a subframe-first manner. That is, index may be given to each ECCE in the order of subframe from the first substrate configuring the MTC-EPDCCH-resource-set. If index is given to the last subframe, indexes may sequentially be given to next ECCE from the first subframe to the last subframe. In this case, ECCEs existing in the MTC-EPDCCH-resource-set have their respective ECCE indexes different from each other. Therefore, the ECCEs existing in the MTC-EPDCCH-resource-set may mutually be identified from one another by ECCE indexes only. Also, if contiguous ECCE indexes configure one MTC-EPDCCH candidate, the ECCEs configuring the MTC-EPDCCH candidate are distributed in different subframes, whereby time diversity effect may be obtained.

Mapping of MTC-EPDCCH to ECCE

One MTC-EPDCCH candidate may be configured by ECCEs as follows.

Alt 1. One MTC-EPDCCH candidate may be comprised of ECCEs existing within one subframe. However, if the amount of ECCEs configuring the MTC-EPDCCH candidate is greater than the number of ECCEs existing within one subframe, ECCE existing at a neighboring subframe (e.g., next subframe) may be used together. For example, when indexes are given to the ECCEs within the MTC-EPDCCH-resource-set as shown in FIG. 12(b), N ECCEs of ECCE k, ECCE k+1, . . . , ECCE k+N−1 may configure one MTC-EPDCCH candidate.

Alt 2. One MTC-EPDCCH candidate may be comprised of ECCEs existing within distributed subframes. However, if the amount of ECCEs configuring the MTC-EPDCCH candidate is greater than the number of subframes configuring the MTC-EPDCCH-resource-set, one or more ECCEs may be used at one subframe. For example, when indexes are given to the ECCEs within the MTC-EPDCCH-resource-set as shown in FIG. 12(b), 4 ECCEs of ECCE 0, ECCE 8, ECCE 16 and ECCE 24 may configure one MTC-EPDCCH candidate. For another example, when indexes are given to the ECCEs within the MTC-EPDCCH-resource-set as shown in FIG. 12(c), N ECCEs of ECCE k, ECCE k+1, . . . , ECCE k+N−1 may configure one MTC-EPDCCH candidate.

Alt 3. X ECCEs may be used per subframe to configure one MTC-EPDCCH candidate. X ECCEs may be used to configure the MTC-EPDCCH candidate at the first subframe, and if the number of ECCEs for the MTC-EPDCCH candidate is not sufficient at the first subframe, X ECCEs may be used at next subframe to configure the MTC-EPDCCH candidate. For example, if EPDCCH is transmitted by aggregation of a total of N ECCEs, ceil (N/X) ECCEs per subframe are used at X subframes. If 'N/X' is not an integer, ECCEs which are not sufficient to configure the EPDCCH are used for the last subframe.

Method for Mapping Resource of DCI

To transmit DCI through a specific MTC-EPDCCH candidate, encoded bits of DCI should be rate-matched with bits that may be transmitted through the MTC-EPDCCH candidate. The rate-matched bits of DCI are mapped into resources configuring the MTC-EPDCCH candidate through a modulation and precoding process. Detailed methods for mapping DCI to MTC-EPDCCH candidate may be as follows.

Alt 1. When DCI to be transmitted through the MTC-EPDCCH exists, DCI encoded by channel coding may be rate-matched with the amount of resources configuring the MTC-EPDCCH candidate and then transmitted through the resources configuring the MTC-EPDCCH candidate. For example, when the MTC-EPDCCH-resource-set is comprised of M subframes, one MTC-EPDCCH candidate may be comprised of a total of X*M ECCEs corresponding to X ECCEs per subframe. In this case, DCI may be rate-matched with the amount of resources where the MTC-EPDCCH may be transmitted within resources of the corresponding X*M ECCEs, and then may be transmitted through the MTC-EPDCCH candidate. At this time, the amount of resources where the MTC-EPDCCH candidate may be transmitted within X*M ECCE resources means RE resources excluding transmission RE resource of a legacy PDCCH, RS (e.g., CRS, DMRS) transmission RE resource, etc. from RE resource constituting X*M ECCEs.

Figure 13:
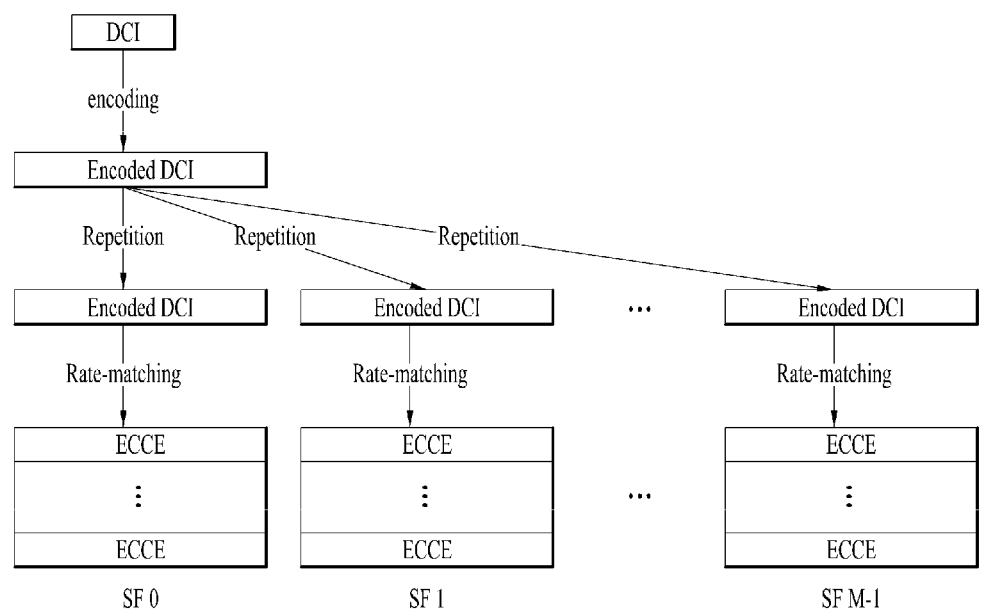
FIG. 13 illustrates an example of DCI mapping into resources in accordance with one embodiment of the present invention.

Alt 2. When DCI to be transmitted through the MTC-EPDCCH exists, DCI encoded by channel coding may be rate-matched with the amount of resources configuring the MTC-EPDCCH candidate every subframe and then transmitted through the resources configuring the MTC-EPDCCH candidate. For example, when the MTC-EPDCCH-resource-set is comprised of M subframes, one MTC-EPDCCH candidate may be comprised of a total of X*M ECCEs corresponding to X ECCEs per subframe. FIG. 13 illustrates an example of DCI mapping into resources in accordance with one embodiment of the present invention. As shown in FIG. 13, the same DCI is transmitted per subframe, and the DCI may be rate-matched with the amount of resources configuring the MTC-EPDCCH candidate for transmitting DCI at the subframe and the transmitted. The amount of resources where the MTC-EPDCCH candidate may be transmitted at the corresponding subframe means RE resources excluding transmission RE resource of a legacy PDCCH, RS (e.g., CRS, DMRS) transmission RE resource, etc. from RE resource constituting X ECCEs within the subframe.

Rate-Matching of DCI

Meanwhile, when DCI is mapped into resources of the MTC-EPDCCH candidate comprised of a plurality of subframes, the number of actual REs that may transmit the MTC-EPDCCH may be different per subframe even though the number of ECCEs configuring the MTC-EPDCCH candidate is equally maintained between subframes. This is because that a type of RS which is transmitted may be different per subframe. For example, CRS and DMRS may exist in subframe #k, and CRS, DMRS and CSI-RS may exist in subframe #k+1. In this case, the amount of RE resources that may transmit the MTC-EPDCCH may be computed per subframe, whereby DCI may be rate-matched. However, the embodiment of the present invention suggests that the same rate-matching pattern should be applied to each subframe to reduce complexity of rate-matching in consideration of a low-complexity UE. This rate-matching pattern may be as follows.

Alt 1. DCI may be rate-matched in accordance with a specific rate-matching pattern defined in the standard.

Alt 2. DCI may be rate-matched in accordance with a rate-matching pattern that considers a CRS, DMRS and/or legacy PDCCH transmission resource region (or MTC-EPDCCH transmission start OFDM symbols position) only. Considering a CRS and DMRS transmission resource region means that a transmission RE position of CRS and DMRS is rate-matched. Considering a legacy PDCCH transmission OFDM symbol region (or MTC-EPDCCH transmission start OFDM symbol position) only means that an OFDM symbol region (or OFDM symbol region located before MTC-EPDCCH transmission start OFDM symbol) to which the legacy PDCCH may be transmitted is rate-matched. At this time, if an RE region where the MTC-EPDCCH cannot be transmitted occurs due to additional RS transmission, it may be assumed that the MTC-EPDCCH is punctured in the RE region.

Alt 3. A rate-matching pattern at the first subframe configuring the MTC-EPDCCH-resource-set or the first subframe configuring the MTC-EPDCCH candidate may equally be applied to all subframes to which the MTC-EPDCCH is transmitted. At this time, although not considered in the rate-matching pattern, if an RE region where the MTC-EPDCCH cannot be transmitted occurs due to additional RS transmission, it may be assumed that the MTC-EPDCCH is punctured in the corresponding RE region.

Mapping of ECCE to EREG at Special Subframe

In a TDD environment, the number of EREGs constituting ECCE at a special subframe (e.g., special subframe configurations 1, 2, 6, 7, 9) having a short DwPTS length is different from the number of EREGs constituting ECCEs at a normal subframe. For example, 4 EREGs configure one ECCE at a normal subframe of a normal CP, whereas 8 EREGs configure one ECCE at such a special subframe, whereby the number of ECCEs existing in one special subframe is half of a normal subframe. In this case, a problem occurs in that the number of ECCEs is varied per subframe. To solve this problem, the following methods may be considered.

Alt 1. PRB resources of two times may be defined to configure the MTC-EPDCCH-resource-set at a special subframe (e.g., special subframe configurations 1, 2, 6, 7, 9) having a short DwPTS length. In this case, the special subframe may have the same number of ECCEs as those of the normal subframe. However, the number of EREGs constituting ECCEs at the special subframe becomes two times of that of the normal subframe.

Alt 2. The same mapping of ECCE to EREG as that of a normal subframe may be used at a special subframe (e.g., special subframe configurations 1, 2, 6, 7, 9) having a short DwPTS length. Even at the special subframe, 4 EREGs may configure one ECCE in the same manner as the normal subframe.

Option 2. A plurality of EPDCCH candidates configure one MTC-EPDCCH candidate.

FIG. 14 illustrates EPDCCH candidate(s) that configure(s) MTC-EPDCCH candidate according to the present invention.

EPDCCH candidate may exist in each subframe within the MTC-EPDCCH-resource-set. N EPDCCH candidates existing in the MTC-EPDCCH-resource-set may configure one MTC-EPDCCH candidate. In this case, N is a value determined in accordance with a TAR value.

For example, as shown in FIG. 14, 4 EPDCCH candidates may exist in each of 8 subframes constituting the MTC-EPDCCH-resource-set as shown in FIG. 14. N EPDCCH candidates of the total of 32 EPDCCH candidates may configure one MTC-EPDCCH candidate.

Alternatively, L EPDCCH candidates per subframe constituting the MTC-EPDCCH-resource-set may configure one MTC-EPDCCH candidate. That is, if the MTC-EPDCCH-resource-set is comprised of M subframes, a total of L*M EPDCCH candidates corresponding to L per subframe may configure one MTC-EPDCCH candidate.

EPDCCH Candidate Indexing

Methods for indexing EPDCCH candidates within MTC-EPDCCH-resource-set may be as follows.

Alt 1. As shown in FIG. 14(a), indexes may be given to EPDCCH candidates within each subframe. In this case, the same EPDCCH candidate index may be used between EPDCCH candidates existing at different subframes. EPDCCH candidates of the same index existing at different subframes may be identified using subframe index.

Alt 2. As shown in FIG. 14(b), indexes may sequentially be given to EPDCCH candidates within one subframe from the first subframe. If the indexes are all given to the EPDCCH candidates within the subframe, the indexes may subsequently be given to EPDCCH candidates existing in next subframe. In this case, the EPDCCH candidates existing in the MTC-EPDCCH-resource-set have their respective EPDCCH candidate indexes different from each other. Therefore, the EPDCCH candidates existing in the MTC-EPDCCH-resource-set may mutually be identified from one another by the EPDCCH candidate indexes only.

Alt 3. As shown in FIG. 14(c), indexes may be given to EPDCCH candidates in a subframe-first manner. For example, index may be given to each EPDCCH candidate in the order of subframe from the first substrate configuring the MTC-EPDCCH-resource-set. If index is given to the EPDCCH candidate of the last subframe, indexes may sequentially be given to next EPDCCH candidate from the first subframe to the last subframe. In this case, the EPDCCH candidates existing in the MTC-EPDCCH-resource-set have their respective EPDCCH indexes different from each other. Therefore, the EPDCCH candidates existing in the MTC-EPDCCH-resource-set may mutually be identified from one another by the EPDCCH candidate indexes only. Also, if EPDCCH candidates having contiguous EPDCCH candidate indexes configure one MTC-EPDCCH candidate, the EPDCCH candidates configuring the MTC-EPDCCH candidate are distributed in different subframes, whereby time diversity effect may be obtained.

Mapping of EPDCCH Candidate to MTC-EPDCCH Candidate

One MTC-EPDCCH candidate may be configured by EPDCCH candidates as follows.

Alt 1. One MTC-EPDCCH candidate may be comprised of EPDCCH candidates existing within one subframe. However, if the amount of EPDCCH candidates configuring the MTC-EPDCCH candidate is greater than the number of EPDCCH candidates existing within one subframe, EPDCCH candidate existing at a neighboring subframe (e.g., next subframe) may be used together. For example, when indexes of EPDCCH candidates within the MTC-EPDCCH-resource-set are given as shown in FIG. 14(*b*), N EPDCCH candidates of EPDCCH candidate k, EPDCCH candidate k+1, . . . , EPDCCH candidate k+N−1 may configure one MTC-EPDCCH candidate.

Alt 2. One MTC-EPDCCH candidate may be comprised of EPDCCH candidates or EPDCCH candidate indexes existing within distributed subframes. If the amount of EPDCCH candidates configuring the MTC-EPDCCH candidate is greater than the number of subframes configuring the MTC-EPDCCH-resource-set, one or more EPDCCH candidates may be used at one subframe. For example, when indexes of the EPDCCH candidates within the MTC-EPDCCH-resource-set are given as shown in FIG. 14(*b*), 4 EPDCCH candidates of EPDCCH candidate 0, EPDCCH candidate 8, EPDCCH candidate 16 and EPDCCH candidate 24 may configure one MTC-EPDCCH candidate. For another example, when indexes of the EPDCCH candidates within the MTC-EPDCCH-resource-set are given as shown in FIG. 14(*c*), N EPDCCH candidates of EPDCCH candidate k, EPDCCH candidate k+1, . . . , EPDCCH k+N−1 may configure one MTC-EPDCCH candidate.

Alt 3. X EPDCCH candidates may be used per subframe to configure one MTC-EPDCCH candidate. X EPDCCH candidates may be used to configure the MTC-EPDCCH candidate at the first subframe, and if the number of EPDCCH candidates at the first subframe is not sufficient to configure the MTC-EPDCCH candidate, the MTC-EPDCCH candidate may be configured in such a manner that X EPDCCH candidates may be used at next subframe to configure the MTC-EPDCCH candidate. For example, if the MTC-EPDCCH is transmitted by aggregation of a total of N EPDCCH candidates, ceil (N/X) EPDCCH candidates per subframe are used at X subframes. If 'N/X' is not an integer, the EPDCCH candidates which are not sufficient to configure the MTC-EPDCCH are used for the last subframe.

Resource Mapping of DCI

To transmit DCI through a specific MTC-EPDCCH candidate, encoded bits of DCI should be rate-matched with bits that may be transmitted through the MTC-EPDCCH candidate. The rate-matched bits of DCI are mapped into resources configuring the MTC-EPDCCH candidate through a modulation and precoding process. Detailed methods for mapping DCI to MTC-EPDCCH candidate may be as follows.

Figure 15:
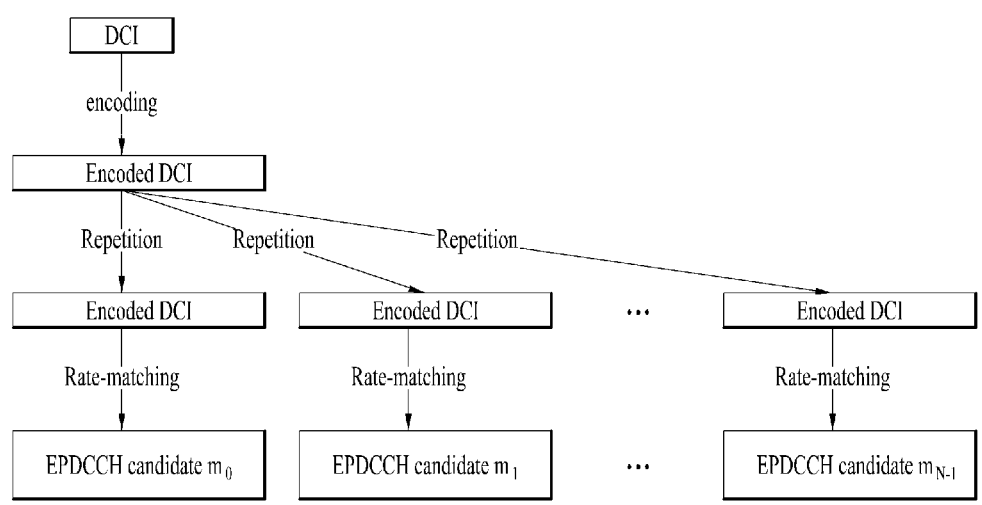
FIG. 15 illustrates an example of DCI mapping into resources in accordance with another embodiment of the present invention.

FIG. 15 illustrates an example of DCI mapping into resources in accordance with another embodiment of the present invention.

As shown in FIG. 15, when DCI to be transmitted through the MTC-EPDCCH exists, DCI encoded by channel coding may be rate-matched with the amount of resources configuring each EPDCCH candidate and then transmitted (repeatedly) through each EPDCCH candidate. At this time, the amount of resources configuring each EPDCCH candidate means RE resources excluding transmission RE resource of a legacy PDCCH, RS (e.g., CRS, DMRS) transmission RE resource, etc. from RE region of ECCE resources constituting EPDCCH candidates.

Rate-Matching of DCI

Meanwhile, when DCI is mapped into resources of the MTC-EPDCCH candidate comprised of a plurality of subframes, the number of actual REs that may transmit the MTC-EPDCCH may be different per EPDCCH candidate even though the number of ECCEs configuring the EPDCCH candidate is equally maintained between EPDCCH candidates configuring the MTC-EPDCCH candidate. This is because that a type of RS which is transmitted may be different per subframe. For example, CRS and DMRS may exist in subframe #k, and CRS, DMRS and CSI-RS may exist in subframe #k+1. In this case, the amount of RE resources that may transmit the MTC-EPDCCH may be computed per EPDCCH candidate, whereby DCI may be rate-matched. However, the embodiment of the present invention suggests that the same rate-matching pattern should be applied to each subframe to reduce complexity of rate-matching in consideration of a low-complexity UE. This rate-matching pattern may be as follows.

Alt 1. DCI may be rate-matched in accordance with a specific rate-matching pattern defined in the standard.

Alt 2. DCI may be rate-matched in accordance with a rate-matching pattern that considers a CRS, DMRS and/or legacy PDCCH transmission resource region (or MTC-EPDCCH transmission start OFDM symbols position) only. Considering a CRS and DMRS transmission resource region means that a transmission RE position of CRS and DMRS is rate-matched. Considering a legacy PDCCH transmission OFDM symbol region (or MTC-EPDCCH transmission start OFDM symbol position) only means that an OFDM symbol region (or OFDM symbol region located before MTC-EPDCCH transmission start OFDM symbol) to which the legacy PDCCH may be transmitted is rate-matched. At this time, if an RE region where the MTC-EPDCCH cannot be transmitted occurs due to additional RS transmission, it may be assumed that the MTC-EPDCCH is punctured in the RE region.

Alt 3. A rate-matching pattern at the first subframe configuring the MTC-EPDCCH-resource-set, a rate-matching pattern at the first subframe configuring the MTC-EPDCCH candidate, or a rate-matching pattern used at the first EPDCCH candidate configuring the MTC-EPDCCH candidate may equally be applied to all subframes/EPDCCH candidates to which the MTC-EPDCCH is transmitted. At this time, although not considered in the rate-matching pattern, if an RE region where the MTC-EPDCCH cannot be transmitted occurs due to additional RS transmission, it may be assumed that the MTC-EPDCCH is punctured in the corresponding RE region.

Mapping of ECCE to EREG at Special Subframe

In a TDD environment, the number of EREGs constituting ECCE at a special subframe (e.g., special subframe configurations 1, 2, 6, 7, 9) having a short DwPTS length is different from the number of EREGs constituting ECCEs at a normal subframe. For example, 4 EREGs configure one ECCE at a normal subframe of a normal CP, whereas 8 EREGs configure one ECCE at such a special subframe. In this case, the number of EPDCCH candidates existing in one special subframe may be varied between the special subframe and the normal subframe. To solve this problem, the following methods may be considered.

Alt 1. PRB resources of two times may be defined to configure the MTC-EPDCCH-resource-set at a special subframe (e.g., special subframe configurations 1, 2, 6, 7, 9) having a short DwPTS length. In this case, the special subframe may have the same number of ECCEs as those of the normal subframe. However, the number of EREGs constituting ECCEs at the special subframe becomes two times of that of the normal subframe.

Alt 2. The same mapping of ECCE to EREG as that of a normal subframe may be used at a special subframe (e.g., special subframe configurations 1, 2, 6, 7, 9) having a short DwPTS length. That is, even at the special subframe, a rule may be defined such that 4 EREGs may configure one ECCE in the same manner as the normal subframe.

If the MTC-EPDCCH is monitored through the MTC-EPDCCH-resource-set comprised of a plurality of subframes, the existing mapping of EREG to ECCE may be changed. Conventionally, 4 (or 8) ERGEs existing within one subframe configure one ECCE. In case of the MTC-EPDCCH, a plurality of (e.g., 4) EREGs existing in the MTC-EPDCCH-resource-set may configure one ECCE. That is, EREGs located at their respective subframes different from each other may configure one ECCE.

Embodiment C. Definition of EPDCCH Transmission Start/End Subframe

Figure 16:
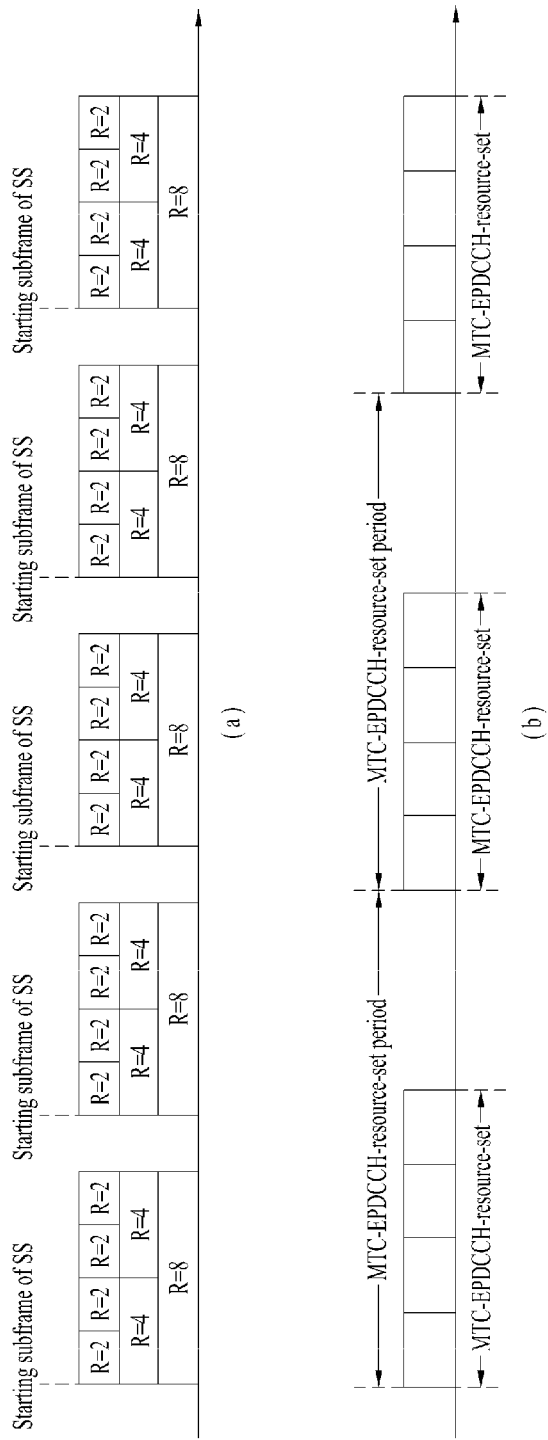
FIG. 16 illustrates a relation between MTC-EPDCCH-resource set and MTC-EPDCCH according to one embodiment of the present invention.

FIG. 16 illustrates a relation between MTC-EPDCCH-resource set and MTC-EPDCCH according to one embodiment of the present invention.

If MTC-EPDCCH is monitored through MTC-EPDCCH-resource-set comprised of a plurality of subframes, a subframe to which MTC-EPDCCH is actually transmitted may be a part of subframes constituting the MTC-EPDCCH-resource-set. For example, although subframes #K to #K+9 configure one MTC-EPDCCH-resource-set, MTC-EPDCCH transmitted to a specific UE may be transmitted through MTC-EPDCCH candidate configured using resource only existing in subframes #K to #K+4.

For example, referring to FIG. 16(a), a transmission start position of MTC-EPDCCH, that is, a start position of MTC-EPDCCH candidate may be different from a start position of a search space (SS) for MTC-EPDCCH. One or more subframes within the SS may be starting subframes of the MTC-EPDCCH candidate in accordance with a repetition level R and/or an aggregation level.

To reduce blind decoding complexity of a UE for receiving MTC-EPDCCH, the UE may need to a start position of a subframe bundle to which MTC-EPDCCH is transmitted, through a bundle of a plurality of subframes. In the embodiments of the present invention, the subframe bundle may be a subframe in which resources constituting one MTC-EPDCCH are distributed. Alternatively, the subframe bundle may be a period for which one MTC-EPDCCH is repeatedly transmitted. To this end, a subframe position where transmission of MTC-EPDCCH starts may not be free unlike the existing case, and the transmission may start through a subframe position only which is previously scheduled. In other words, the MTC-EPDCCH may not start through a random subframe within the MTC-EPDCCH-resource-set but start through subframe(s) only which is(are) previously scheduled among subframes within the MTC-EPDCCH-resource-set.

As shown in FIG. 16(a), the starting subframe of the MTC-EPDCCH-resource-set may be different from the transmission starting subframe of the MTC-EPDCCH actually transmitted to the UE. For this case, the present invention suggests that a starting subframe (that is, first subframe) position of the MTC-EPDCCH-resource-set not the transmission starting subframe of the MTC-EPDCCH is limited to a set of specific subframes. Therefore, the UE may assume that a starting subframe of the MTC-EPDCCH-resource-set is located at a specific subframe position only. If the MTC-EPDCCH-resource-set may start at a specific subframe only, it may mean that a period exists in a subframe duration for generating the MTC-EPDCCH-resource-set as shown in FIG. 16(b). The MTC-EPDCCH-resource-set period may be prefixed, or may be a value configured for the UE from the eNB through SIB or higher layer signaling (e.g., RRC signaling).

Figure 17:
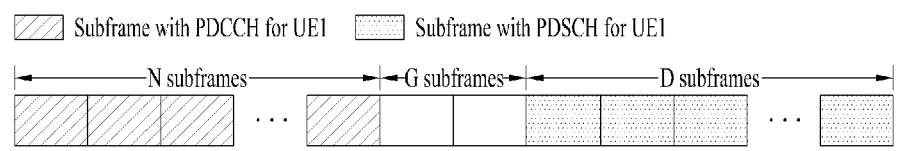
FIG. 17 illustrates a relation between MTC-EPDCCH and corresponding PDSCH according to one embodiment of the present invention.

FIG. 17 illustrates a relation between MTC-EPDCCH and corresponding PDSCH according to one embodiment of the present invention.

To reduce blind decoding complexity of a UE for receiving PDSCH, as shown in FIG. 17, PDSCH transmission may start after MTC-EPDCCH transmission ends. In this case, a transmission starting subframe position of PDSCH may be defined from the transmission end subframe of the MTC-EPDCCH to subframe after G subframes. However, the end subframe position of the MTC-EPDCCH-resource-set may be different from the transmission end subframe of the MTC-EPDCCH actually transmitted to the UE, that is, the last subframe. For this case, the present invention suggests that the UE assume that PDSCH transmission starts from the last subframe of the MTC-EPDCCH-resource-set not the transmission end subframe of the MTC-EPDCCH to subframe after G subframe(s). That is, a relation between the last subframe of the MTC-EPDCCH-resource-set and the transmission starting subframe of the PDSCH may be defined. Alternatively, a relation between the starting subframe of the MTC-EPDCCH-resource-set and the transmission starting subframe of the PDSCH may be defined.

The present invention may be carried in accordance with combination of one or two or more of the aforementioned embodiments A, B and C.

Figure 18:
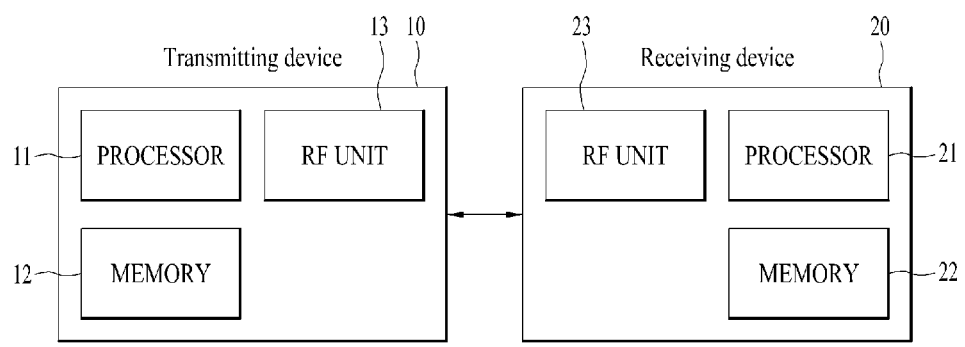
FIG. 18 is a block diagram illustrating elements of a transmitting device 10 and a receiving device 20, through which the present invention is performed.

FIG. 18 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device or the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer of 1 or more) transmitting antennas.

A signal processing process of the receiving device 20 is the reverse of the signal processing process of the transmitting device 10. Under the control of the processor 21, the RF unit 23 of the receiving device 20 receives radio signals transmitted by the transmitting device 10. The RF unit 23 may include $N_r$ receiving antennas and frequency down-converts each signal received through receiving antennas into a baseband signal. The RF unit 13 may include an oscillator for frequency down-conversion. The processor 21 decodes and demodulates the radio signals received through the receiving antennas and restores data that the transmitting device 10 intended to transmit.

The RF units 13 and 23 include one or more antennas. An antenna performs a function for transmitting signals processed by the RF units 13 and 23 to the outside or receiving radio signals from the outside to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted through a corresponding antenna defines an antenna from the view point of the receiving device 20 and enables the receiving device 20 to derive channel estimation for the antenna, irrespective of whether the channel represents a single radio channel from one physical antenna or a composite channel from a plurality of physical antenna elements including the antenna. That is, an antenna is defined such that a channel carrying a symbol of the antenna can be obtained from a channel carrying another symbol of the same antenna. An RF unit supporting a MIMO function of transmitting and receiving data using a plurality of antennas may be connected to two or more antennas.

In the embodiments of the present invention, a UE operates as the transmitting device 10 in UL and as the receiving device 20 in DL. In the embodiments of the present invention, an eNB operates as the receiving device 20 in UL and as the transmitting device 10 in DL. Hereinafter, a processor, an RF unit, and a memory included in the UE will be referred to as a UE processor, a UE RF unit, and a UE memory, respectively, and a processor, an RF unit, and a memory included in the eNB will be referred to as an eNB processor, an eNB RF unit, and an eNB memory, respectively.

The eNB processor may configure a search space in accordance with any one of the embodiments of the present invention. The eNB processor may control the eNB RF unit to transmit configuration information of the SS. The configuration information of the SS may include information indicating a starting subframe of an MTC-EPDCCH-resource-set for the SS or a period of the MTC-EPDCCH-resource-set. The eNB processor may control the eNB RF unit to transmit downlink control information (DCI) through one of a plurality of EPDCCH candidates configured in the search space in accordance with any one of the embodiments of the present invention. The eNB processor may control the eNB RF unit to repeatedly transmit the DCI through two or more of the plurality of EPDCCH candidates. The eNB processor may control the eNB RF unit to transmit PDSCH or receive PUSCH on the basis of the DCI in accordance with any one of the embodiments of the present invention. The eNB processor may control the eNB RF unit to start transmission of the PDSCH at the last subframe n of the MTC-EPDCCH-resource-set, that is, subframe n+k subsequent to the last subframe n of the search space in accordance with any one of the embodiments of the present invention.

The UE processor may configure a search space in accordance with any one of the embodiments of the present invention. The UE RF processor may receive configuration information of the SS, and the UE processor may configure the SS on the basis of the configuration information of the SS. The UE processor may monitor EPDCCH in the search space to detect DCI. The UE processor may control the UE RF unit to receive the DCI through one or more of a plurality of EPDCCH candidates configured in the search space in accordance with any one of the embodiments of the present invention. The UE processor may attempt to decode two or more of the plurality of EPDCCH candidates to repeatedly receive the DCI. The UE processor may control the UE RF unit to repeatedly receive the DIC through two or more EPDCCHs in the search space. The UE processor may control the UE RF unit to transmit PDSCH or receive PUSCH on the basis of the DCI in accordance with any one of the embodiments of the present invention. The UE processor may control the UE RF unit to start transmission of the PDSCH at the last subframe n of the MTC-EPDCCH-resource-set, that is, subframe n+k subsequent to the last subframe n of the search space in accordance with any one of the embodiments of the present invention.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. The above embodiments are therefore to be construed in all aspects as illustrative and not restrictive. Therefore, the present invention intends not to limit the embodiments disclosed herein but to give a broadest range matching the principles and new features disclosed herein.

INDUSTRIAL APPLICABILITY

The embodiments of the present invention may be used for a base station or UE, and other equipment in a wireless communication systems.

The invention claimed is:

1. A method for receiving signals by a user equipment (UE) in a wireless communication system supporting a machine type communication (MTC), the method comprising:
   receiving configuration information of an MTC physical downlink control channel (PDCCH) for the UE,
   wherein the configuration information indicates a number of a plurality of consecutive subframes for receiving the MTC PDCCH, and a starting subframe of the plurality of consecutive subframes is periodically configured with a periodicity of the indicated number, and
   wherein a candidate of the MTC PDCCH comprises a plurality of control channel elements (CCEs) per subframe and the candidate of the MTC PDCCH is repeated within the plurality of consecutive subframes; and
   repeatedly receiving downlink control information by monitoring the candidate of the MTC PDCCH within the plurality of consecutive subframes.

2. The method according to claim 1, wherein the starting subframe of the plurality of consecutive subframes is determined based on the configuration information.

3. The method according to claim 1, further comprising:
   receiving a physical downlink shared channel (PDCCH) based on the downlink control information from a subframe n+k,
   wherein a subframe n is a subframe lastly receiving the MTC PDCCH within the plurality of consecutive subframes, and k is a positive integer.

4. The method according to claim 1, wherein each of the plurality of consecutive subframes is divided into a control region and a data region in a time domain, the control region including one or more front symbols and the data region including symbols which do not belong to the control region, and the MTC PDCCH is received within the data region.

5. The method according to claim 1, wherein a physical resource block (PRB) location for the MTC PDCCH is maintained equally within the plurality of consecutive subframes.

6. The method according to claim 5, wherein the PRB location is limited within 6 resource blocks.

7. The method according to claim 1, wherein a physical resource block (PRB) location for the MTC PDCCH varies per subframe within the plurality of consecutive subframes.

8. The method according to claim 7, wherein the PRB location is limited within 6 resource blocks.

9. A user equipment (UE) configured to receive signals in a wireless communication system supporting a machine t me communication (MTC), the UE comprising:
   a transceiver; and
   a processor configured to:
   control the transceiver to receive configuration information of an MTC physical downlink control channel (PDCCH) for the UE,
   wherein the configuration information indicates a number of a plurality of consecutive subframes for receiving the MTC PDCCH, and a starting subframe of the plurality of consecutive subframes is periodically configured with a periodicity of the indicated number, and
   wherein a candidate of the MTC PDCCH comprises a plurality of control channel elements (CCEs) per subframe and the candidate of the MTC PDCCH is repeated within the plurality of consecutive subframes, and
   control the transceiver to repeatedly receive downlink control information by monitoring the candidate of the MTC PDCCH within the plurality of consecutive subframes.

10. The UE according to claim 9, wherein the starting subframe of the plurality of consecutive subframes is determined based on the configuration information.

11. The UE according to claim 9, wherein the processor is further configured to control the transceiver to receive a physical downlink shared channel (PDSCH) based on the downlink control information from a subframe n+k, and
    wherein a subframe n is a subframe lastly receiving the MTC PDCCH within the plurality of consecutive subframes, and k is a positive integer.

12. The UE according to claim 9, wherein each of the plurality of consecutive subframes is divided into a control region and a data region in a time domain, the control region including one or more front symbols and the data region including symbols which do not belong to the control region, and the MTC PDCCH is received within the data region.

13. The UE according to claim 9, wherein a physical resource block (PRB) location for the MTC PDCCH is maintained equally within the plurality of consecutive subframes.

14. The UE according to claim 13, wherein the PRB location is limited within 6 resource blocks.

15. The UE according to claim 9, wherein a physical resource block (PRB) location for the MTC PDCCH varies per subframe within the plurality of consecutive subframes.

16. The UE according to claim 15, wherein the PRB location is limited within 6 resource blocks.

17. A method for transmitting signals by a base station in a wireless communication system supporting a machine type communication (MTC), the method comprising:
    transmitting configuration information of an MTC physical downlink control channel (PDCCH) for a user equipment (UE),
    wherein the configuration information indicates a number of a plurality of consecutive subframes for transmitting the MTC PDCCH, and a starting subframe of the plurality of consecutive subframes is periodically configured with a periodicity of the indicated number, and
    wherein the MTC PDCCH comprises a plurality of control channel elements (CCEs) per subframe and the MTC PDCCH is repeated within the plurality of consecutive subframes; and
    repeatedly transmitting downlink control information by transmitting the MTC PDCCH within the plurality of consecutive subframes.

* * * * *